US012666385B2

(12) United States Patent
Xu et al.

(10) Patent No.: US 12,666,385 B2
(45) Date of Patent: Jun. 23, 2026

(54) ASSISTANCE IN RANGING A COMMUNICATION DEVICE

(71) Applicant: Lenovo (Beijing) Limited, Beijing (CN)

(72) Inventors: Min Xu, Beijing (CN); Haiming Wang, Beijing (CN); Jing Han, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 380 days.

(21) Appl. No.: 18/273,577

(22) PCT Filed: Jan. 29, 2021

(86) PCT No.: PCT/CN2021/074439
§ 371 (c)(1),
(2) Date: Jul. 21, 2023

(87) PCT Pub. No.: WO2022/160256
PCT Pub. Date: Aug. 4, 2022

(65) Prior Publication Data
US 2024/0137892 A1      Apr. 25, 2024

(51) Int. Cl.
*H04W 64/00*          (2009.01)

(52) U.S. Cl.
CPC .................................... *H04W 64/00* (2013.01)

(58) Field of Classification Search
CPC .............................. H04W 64/00; H04W 4/023
See application file for complete search history.

(56) References Cited

U.S. PATENT DOCUMENTS

| | | | | |
|---|---|---|---|---|
| 10,582,469 B2 * | 3/2020 | Vamaraju | ................ | H04L 43/16 |
| 2014/0045503 A1 * | 2/2014 | Fukuda | ............. | H04W 36/0061 |
| | | | | 455/437 |
| 2017/0041926 A1 * | 2/2017 | Qi | ........................... | G01S 13/74 |

FOREIGN PATENT DOCUMENTS

| | | |
|---|---|---|
| CN | 101385379 A | 3/2009 |
| CN | 104185273 A | 12/2014 |
| CN | 108964867 A | 12/2018 |
| CN | 111386740 A | 7/2020 |
| CN | 112205008 A | 1/2021 |

(Continued)

OTHER PUBLICATIONS

PCT/CN2021/074439 , "International Preliminary Report on Patentability", PCT Application No. PCT/CN2021/074439, Aug. 10, 2023, 5 pages.

(Continued)

*Primary Examiner* — Dhaval V Patel

(74) *Attorney, Agent, or Firm* — FIG. 1 Patents

(57) ABSTRACT

A method performed by a first communication device includes transmitting, to a second communication device, a request to assist in a ranging between the first communication device and a third communication device. The method also includes receiving, from the second communication device, a response to the request. The method further includes based on ranging information comprised in the response, wherein the ranging information is associated with the second communication device for assisting with the ranging between the first and third communication devices, providing a first ranging with the third communication device via the second communication device.

20 Claims, 10 Drawing Sheets

(56)             References Cited

FOREIGN PATENT DOCUMENTS

| | | | |
|---|---|---|---|
| JP | 2010160132 | A | 7/2010 |
| KR | 20100113138 | A | 10/2010 |

OTHER PUBLICATIONS

PCT/CN2021/074439 , "International Search Report and Written Opinion", PCT Application No. PCT/CN2021/074439, Oct. 20, 2021, 6 pages.

* cited by examiner

400

110     410     120

420     430

130-1

130-2

130-3

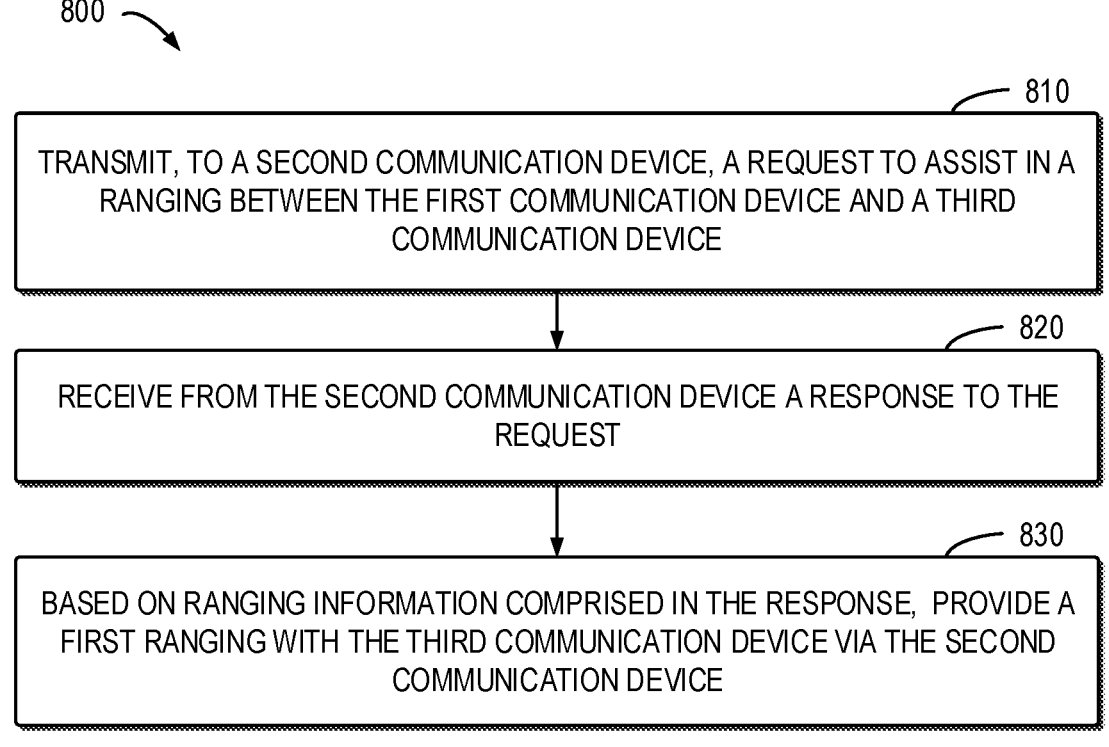

800

810

TRANSMIT, TO A SECOND COMMUNICATION DEVICE, A REQUEST TO ASSIST IN A RANGING BETWEEN THE FIRST COMMUNICATION DEVICE AND A THIRD COMMUNICATION DEVICE

820

RECEIVE FROM THE SECOND COMMUNICATION DEVICE A RESPONSE TO THE REQUEST

830

BASED ON RANGING INFORMATION COMPRISED IN THE RESPONSE, PROVIDE A FIRST RANGING WITH THE THIRD COMMUNICATION DEVICE VIA THE SECOND COMMUNICATION DEVICE

RECEIVE, FROM A SECOND COMMUNICATION DEVICE, A REQUEST TO ASSIST IN A RANGING BETWEEN THE SECOND COMMUNICATION DEVICE AND A THIRD COMMUNICATION DEVICE

920

TRANSMIT A RESPONSE TO THE REQUEST TO THE SECOND COMMUNICATION DEVICE, TO ASSIST IN THE RANGING BETWEEN THE SECOND AND THIRD COMMUNICATION DEVICES

ASSISTANCE IN RANGING A COMMUNICATION DEVICE

FIELD

The present disclosure relates generally to wireless communications, and more particularly to wireless communications systems, devices, methods, and computer readable medium for assistance in ranging a communication device.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ranging service or ranging in short refers to the determination of at least one of the distance between two User Equipment (UEs) and the direction of one UE from the other one via direct communication connection. A ranging result can be used to emerge ranging-based services, e.g. UE discovery for sharing a video between friends. Typically, the ranging does not require a network to deploy positioning infrastructures or provide positioning services, as the ranging is directly performed between two or more UEs involved. Ranging-based services are different from positioning services which can be sensitive due to privacy or regulation concerns. Ranging-based services are becoming popular in a variety of vertical fields such as consumer, smart home, smart city, smart transportation and industry.

SUMMARY

In general, example embodiments of the present disclosure provide a solution for assistance in ranging a communication device.

In a first aspect, an exemplary embodiment of the present disclosure provides a method performed by a first communication device. The method incudes transmitting, to a second communication device, a request to assist in a ranging between the first communication device and a third communication device; receiving, from the second communication device, a response to the request; and based on ranging information comprised in the response, wherein the ranging information is associated with the second communication device for assisting with the ranging between the first and third communication devices, providing a first ranging with the third communication device via the second communication device.

In a second aspect, an exemplary embodiment of the present disclosure provides a method performed by a first communication device. The method incudes receiving, from a second communication device, a request to assist in a ranging between the second communication device and a third communication device; and transmitting a response to the request to the second communication device, to assist in the ranging between the second and third communication devices, wherein ranging information associated with the first communication device is comprised in the response, the ranging information being for assisting with a first ranging between the second and third communication devices via the first communication device.

In a third aspect, an exemplary embodiment of the present disclosure provides a first communication device. The first communication device includes a processor and a transceiver coupled to the processor. The processor is configured to transmit, via the transceiver, to a second communication device a request to assist in a ranging between the first communication device and a third communication device; receive, via the transceiver, a response to the request from the second communication device; and based on ranging information comprised in the response, wherein the ranging information is associated with the second communication device for assisting with the ranging between the first and third communication devices, provide a first ranging with the third communication device via the second communication device.

In a fourth aspect, an exemplary embodiment of the present disclosure provides a first communication device. The first communication device includes a processor and a transceiver coupled to the processor. the processor is configured to: receive, via the transceiver, from a second communication device a request to assist in a ranging between the first communication device and a third communication device; and transmit, via the transceiver, a response to the request to the second communication device, to assist in the ranging between the second and third communication devices, wherein ranging information associated with the first communication device is comprised in the response, the ranging information being for assisting with a first ranging between the second and third communication devices via the first communication.

In a fifth aspect, an exemplary embodiment of the present disclosure provides a computer readable medium having instructions stored thereon, the instructions, when executed on at least one processor, causing the at least one processor to carry out the method according to the first aspect.

In a sixth aspect, an exemplary embodiment of the present disclosure provides a computer readable medium having instructions stored thereon, the instructions, when executed on at least one processor, causing the at least one processor to carry out the method according to the second aspect.

This Summary is provided to introduce a selection of embodiments described herein in a simplified form that are further described below in the Detailed Description along with other embodiments. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

The term "UE" can be interchanged in this specification with the broader term "electronic device" and vice versa.

BRIEF DESCRIPTION OF THE DRAWINGS

The scope of the present disclosure is best understood from the following detailed description of exemplary embodiments when read in conjunction with the accompanying drawings, wherein:

FIG. 8 illustrates a flowchart of an example method according to some embodiments of the present disclosure;

Figure 1:
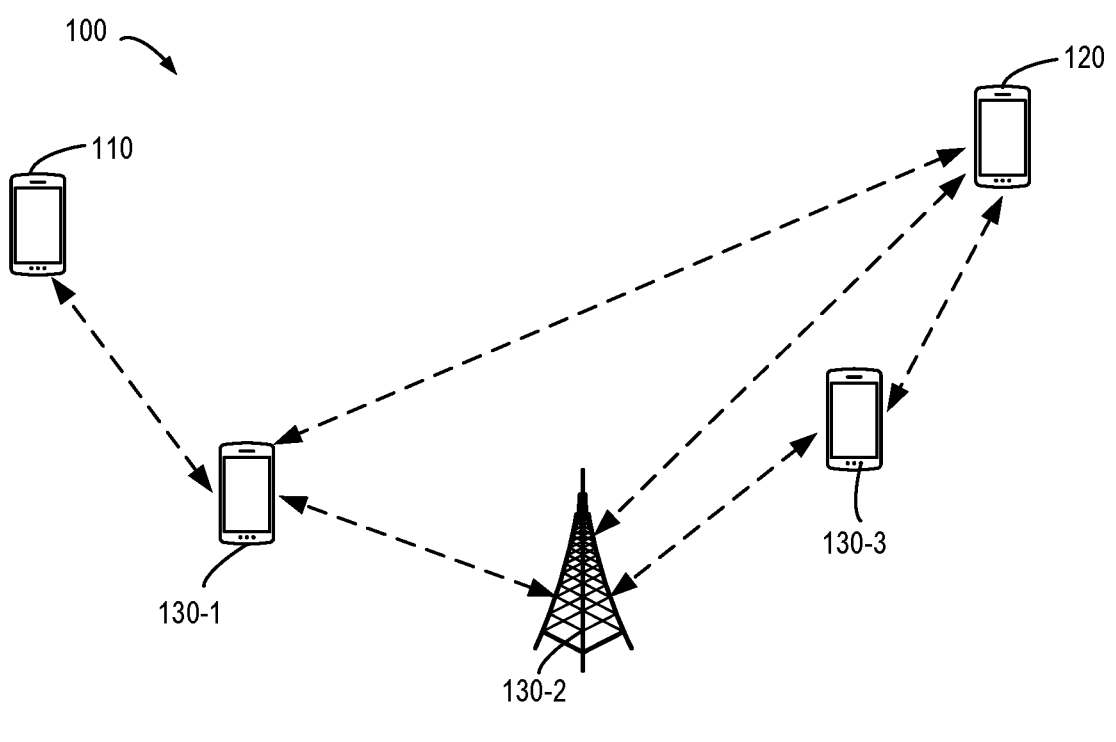
FIG. 1 illustrates a communication environment in which embodiments of the present disclosure can be implemented.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service.

---

ABBREVIATIONS

| | |
|---|---|
| 3GPP | $3^{rd}$ Generation Partnership Project |
| CN | Core Network |
| UE | User Equipment |
| 5G | The fifth generation |
| RRC | Radio Resource Control |
| NR | New Radio |
| ERD | Effective ranging distance |
| UAV | Unmanned Aerial Vehicle |
| BS | Base Station |
| NAS | Non-Access Stratum |

---

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "terminal", "user equipment" and "UE" can be used interchangeably.

Communication discussed herein can conform to any suitable wireless interface standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, such communication can be performed according to any communication protocol either currently known or to be developed in the future. Examples of the communication protocols include, but are not limited to, the first generation (1G), the second generation (2G), 2.5G, 2.75G, the third generation (3G), the fourth generation (4G), 4.5G, the fifth generation (5G) communication protocols. The techniques described herein can be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like can refer to different or same objects. Other definitions, explicit and implicit, can be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As used herein, the term "a ranging result for a first device and a second device" and its variant may refer to a ranging result from the first device to the second device or a ranging result from the second device to the first device.

As briefly mentioned above, the ranging-based services are becoming popular. Currently, several use cases are given for ranging-based services, including but not limited to, smart home control, smart TV control, smart, vehicle key, hands free access, transportation validation, perception for public safety, vending machine, and picture and video sharing. Ranging service can be supported with or without 5G coverage. Table 1 gives the key performance indicators (KPIs) of typical use cases.

TABLE 1

| | Effective ranging distance (ERD) | Distance accuracy | Direction accuracy | Latency | Relative UE velocity | Ranging interval |
|---|---|---|---|---|---|---|
| Use case | | | | | | |
| smart home control | 20 m | 10 cm | — | 50 ms | <1 m/s | 50 ms |
| smart TV control | 10 m | 10 cm | ±2° | 10 ms | <10 m/s | 50 ms |
| smart vehicle key | 100 m | 1 m | — | 50 ms | <1 m/s | — |
| hands free access | 0.1 m~10 m | 50 cm | — | 50 ms | <10 m/s | — |
| transportation validation | 0.1 m~10 m | 10 cm | — | 50 ms | <10 m/s | — |
| perception for public safety | 0.1 m~20 m | 50 cm | — | 50 ms | <10 m/s | — |
| picture and video sharing | 10 m | 10 cm | — | 50 ms | <1 m/s | 50 ms |
| vending machine | 5 m | 20 cm | 10° | 150 ms | <1 m/s | 50 ms |

*KPIs for typical use cases*

As one of the KPIs, an effective ranging distance (ERD) refers to the largest distance between the UE who initiates the ranging (which is also referred to as an "observer UE") and target UEs in the ranging operation. As can be seen from Table 1, the ERDs for the user cases do not exceed 100 m. More particularly, the ERDs for most user cases do not exceed 20 m. Except for a characteristic of a specific application scenario, one of the most essential causes that limit the ERD is a hardware capability or cost of the UE. For example, a wearable device cannot be mounted with a large, long-range radio frequency (RF) unit given its size, weight or body effect, while a tag for ranging on an item in a supermarket has cost or battery concerns. In these use cases, the observer UE has to be physically close to the target UE in order to enable the ranging service and obtain desired information.

There are some other use cases of ranging services that may require longer ranging distance, for example, communication and management of an Unmanned Aerial Vehicle (UAV) swarm. For a UAV swarm with multiple UAVs, ranging information between UAVs can be used to identify close UAVs that may share similar link conditions, measurement results or flight paths so as to achieve group handover or avoid duplicated report to the network. The ranging information can also be used to identify close UAVs that may guarantee a reliable radio connection (e.g. a sidelink) and routing for data transmission. Other application of the ranging information can include for example maintaining swarm formation or implementing geofencing for the swarm. However due to the restriction of a battery, weight or interference control, it is hard as well for a UAV to be mounted with a large, long-range RF unit to enable further ranging applications.

In an aspect, conventionally the ranging is directly performed between two UEs, and there may or may not be 5G network coverage. As a result, the ERD is limited due to device capabilities (for example the size, weight, cost, battery) or regulations. Therefore, in the conventional solution, the ranging-based services are limited by the device capabilities.

The conventional solution still focuses on direct ranging between two UEs, e.g. a smart vehicle key and a vehicle, a remoter and a smart TV, a smart phone and a speaker or a vending machine. There is no third UE involved for assisting in the ranging. Although 5G network coverage is mentioned in the conventional solution, the role of the network in a ranging procedure is unclear. For example, it is unclear whether the network is involved in the ranging procedure. As a result, there is no base station (BS) involved for assisting in the ranging.

In another aspect, sidelink communication has been proposed. The sidelink communication is a communication mode wherein UEs can communicate with each other directly over the PC5 interface. This communication mode is supported when the UE is served by Evolved Universal Terrestrial Radio Access network (E-UTRAN) and when the UE is out of Evolved Universal Terrestrial Radio Access (E-UTRA) coverage. Only those UEs authorised to be used for a public safety operation can perform sidelink communication.

Sidelink discovery is defined as a procedure used by the UE supporting sidelink discovery to discover other UE(s) in its proximity, using E-UTRA direct radio signals via PC5 interface. The sidelink discovery is supported both when the UE is served by the E-UTRAN and when the UE is out of the EUTRA coverage. Only Proximity Services (ProSe)-enabled public safety UE can perform sidelink discovery when it is out of the E-UTRA coverage.

As can be seen, the sidelink can be used to discovery the existence of a UE nearby and/or to establish a communication connection, which has a different purpose with the ranging service. Thus, distance or direction information is unknown to the UEs. However, the sidelink can be used to assist the ranging on the UEs.

Embodiments of the present disclosure provide a solution for assistance in ranging a communication device, especially a terminal device. According to embodiments of the present disclosure, at least one assistance device (for example, a UE or a BS) assists an observer terminal device in ranging on a target terminal device. In this way, a ranging service beyond the capability of a single terminal device is enabled with the help of the at least one assistant device. The at least one assistant device with a ranging capability, for example a UE or a BS with the ranging capability, can assist in the ranging without RF improvement. As such, the issue of limited ranging distance due to device capabilities or regulations can be alleviated and the application of ranging-based services can thus be extended.

Some example embodiments of the present disclosure will be described in detail below with reference to FIGS. 1-10.

Example Communication System and Networks

FIG. 1 illustrates a communication environment 100 in which embodiments of the present disclosure can be implemented. The communication environment 100 includes a terminal device 110 (also referred to as "a first terminal device 110") and a terminal device 120 (also referred to as "a second terminal device 120"). In the communication environment 100, the first terminal device 110 intends to obtain a ranging result of the second terminal device 120. In other words, the first terminal device 110 intends to determine a distance between the first terminal device 110 and the second terminal device 120 or a direction of the second terminal device 120 relative to the first terminal device 110. For example, when a ranging-based service is needed by the first terminal device 110, the first terminal device 110 can try to obtain the ranging result of the second terminal device 120. Accordingly, the first terminal device 110 can be considered as an observer UE and the second terminal device 120 can be considered as a target UE.

In addition to the first terminal device 110 and the second terminal device 120, the communication network 100 further includes at least one communication device. As shown in FIG. 1, the communication network 100 further includes a communication device 130-1, a communication device 130-2 and a communication device 130-3, which can be collectively referred to as "communication devices 130" or individually referred to as "a communication device 130". The communication device 130 can assist the first terminal device 110 in a ranging between the first terminal device 110 and the second terminal device 120. That is, the communication device 120 can assist the first terminal device 110 in obtaining a ranging result of the second terminal device 120. Accordingly, the communication device 130 can act as an "assistant device".

Although the communication devices 130-1 and 130-3 are shown as terminal devices and the communication device 130-2 is shown as a network device, it is only for the purpose of illustration without suggesting any limitations. The communication network 100 can include any suitable number of communication devices and any suitable type of communication devices. In some embodiments, each of the communication devices 130 can be a network device, for example, a BS. Alternatively, in some embodiments, each of the communication devices 130 can be a terminal device, for example, a UE.

Communications in the communication network 100 can be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as institute for Electrical and Electronics Engineers (IEEE) 802.11 and the like, and/or any other protocols currently known or to be developed in the future. Moreover, the communication can utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided. Multiple Access (OFDMA) and/or any other technologies currently known or to be developed in the future.

Communications between terminal devices in the communication network 100 can be performed via a sidelink between the terminal devices. Communications between a terminal device and a network device in the communication network 100 can be performed within network coverage of the network device.

Figure 2:
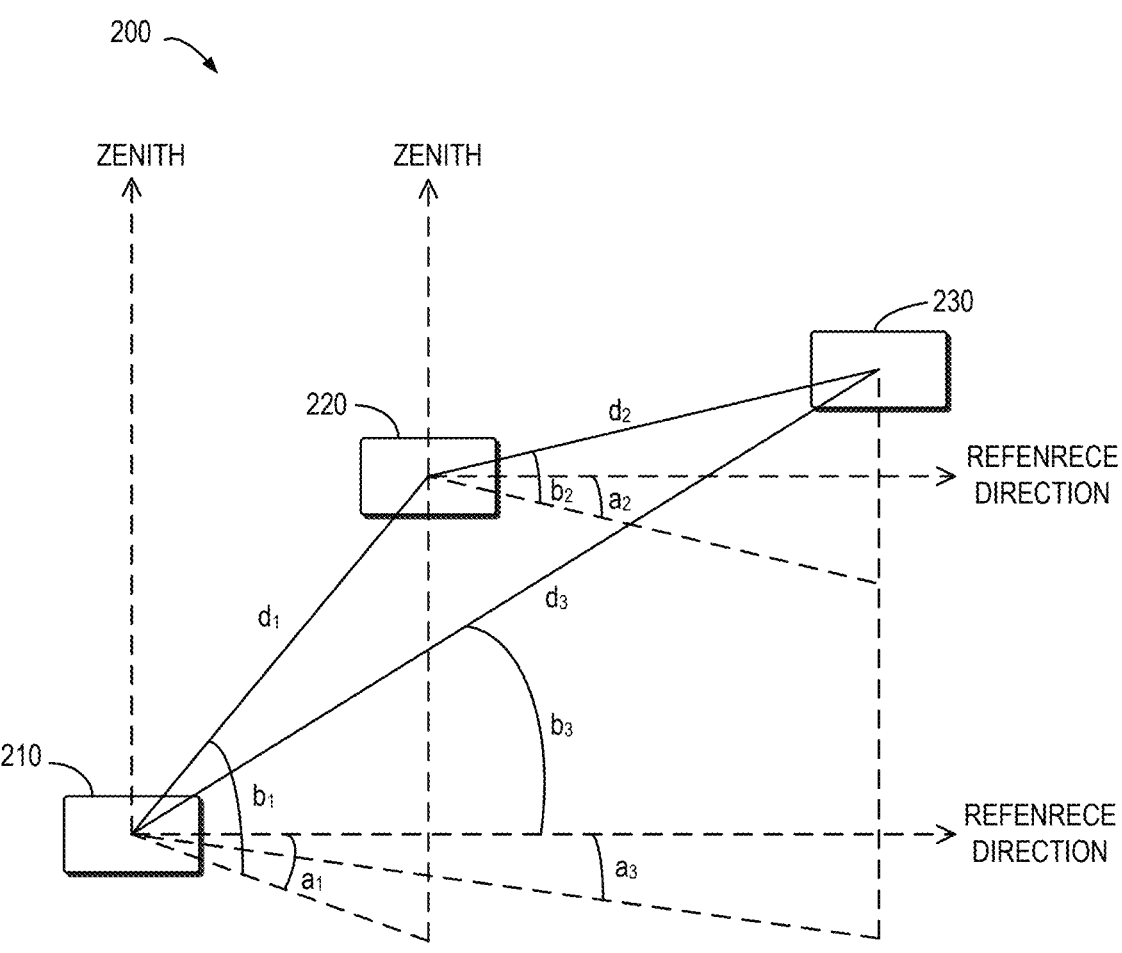
FIG. 2 illustrates a schematic diagram of deriving a ranging result according to some embodiments of the present disclosure.

In the embodiments of the present disclosure, the ranging between the first terminal device 110 and the second terminal device 120 is assisted by at least one assistant device. To better understand the proposed solution, reference is now made to FIG. 2 to describe a general process for deriving a ranging result. FIG. 2 illustrates a schematic diagram of deriving a ranging result according to some embodiments of the present disclosure.

A ranging result represented in a celestial coordinate can comprise a distance, an azimuth angle and an elevation angle. As shown in FIG. 2, a first ranging result from the first device 210 to the second device 220 can comprise a distance $d_1$ between the first device 210 and the second device 220, an azimuth angle $a_1$ from the first device 210 to the second device 220, and an elevation angle $b_1$ from the first device 210 to the second device 220. Similarly, a second ranging result from the second device 220 to the third device 230 can comprise a distance $d_2$ between the second device 220 and the third device 230, an azimuth angle $a_2$ from the second device 220 to the third device 230, and an elevation angle $b_2$ from the second device 220 to the third device 230.

A third ranging result from the first device 210 to the third device 230 can be derived from the first and second ranging results. Specifically, a distance $d_3$ between the first device 210 and the third device 230 can be derived by the following equation (1):

$$d_3 = \sqrt{d_1^2 + d_2^2 + 2d_1 d_2 \cos b_1 \cos b_2 \ (\sin a_1 \sin a_2 + \cos a_1 \cos a_2)}. \tag{1}$$

An azimuth angle $a_3$ from the first device 210 to the third device 230 can be derived by the following equation (2):

$$a_3 = \tan^{-1}\left[\frac{d_1 \cos b_1 \sin a_1 + d_2 \cos b_2 \sin a_2}{d_1 \cos b_1 \cos a_1 + d_2 \cos b_2 \cos a_2}\right]. \tag{2}$$

An elevation angle $b_3$ from the first device 210 to the third device 230 can be derived by the following equation (3):

$$b_3 = \sin^{-1}\left[\frac{d_1 \sin b_1 + d_2 \sin b_2}{d_3}\right]. \tag{3}$$

The accuracy or reliability of the third ranging result (e.g., for the distance, the azimuth angle or the elevation angle) from the first device 210 to the third device 230 can be determined based on those of the first and second ranging results. As an example, the accuracy of the third ranging result can be determined by multiplexing the accuracy of the first ranging result and the accuracy of the second ranging result. Similarly, the reliability of the third ranging result can be determined by multiplexing the reliability of the first ranging result and the reliability of the second ranging result.

The devices 210, 220, 230 can be any three of the devices shown in FIG. 1. For example, a ranging result from the first terminal device 110 to the second terminal device 120 can be derived from a ranging result from the communication device 130 to the second terminal device 120 and a ranging result from the first terminal device 110 to the communication device 130.

Example Processes Involving an Assistant Device

Figure 3:
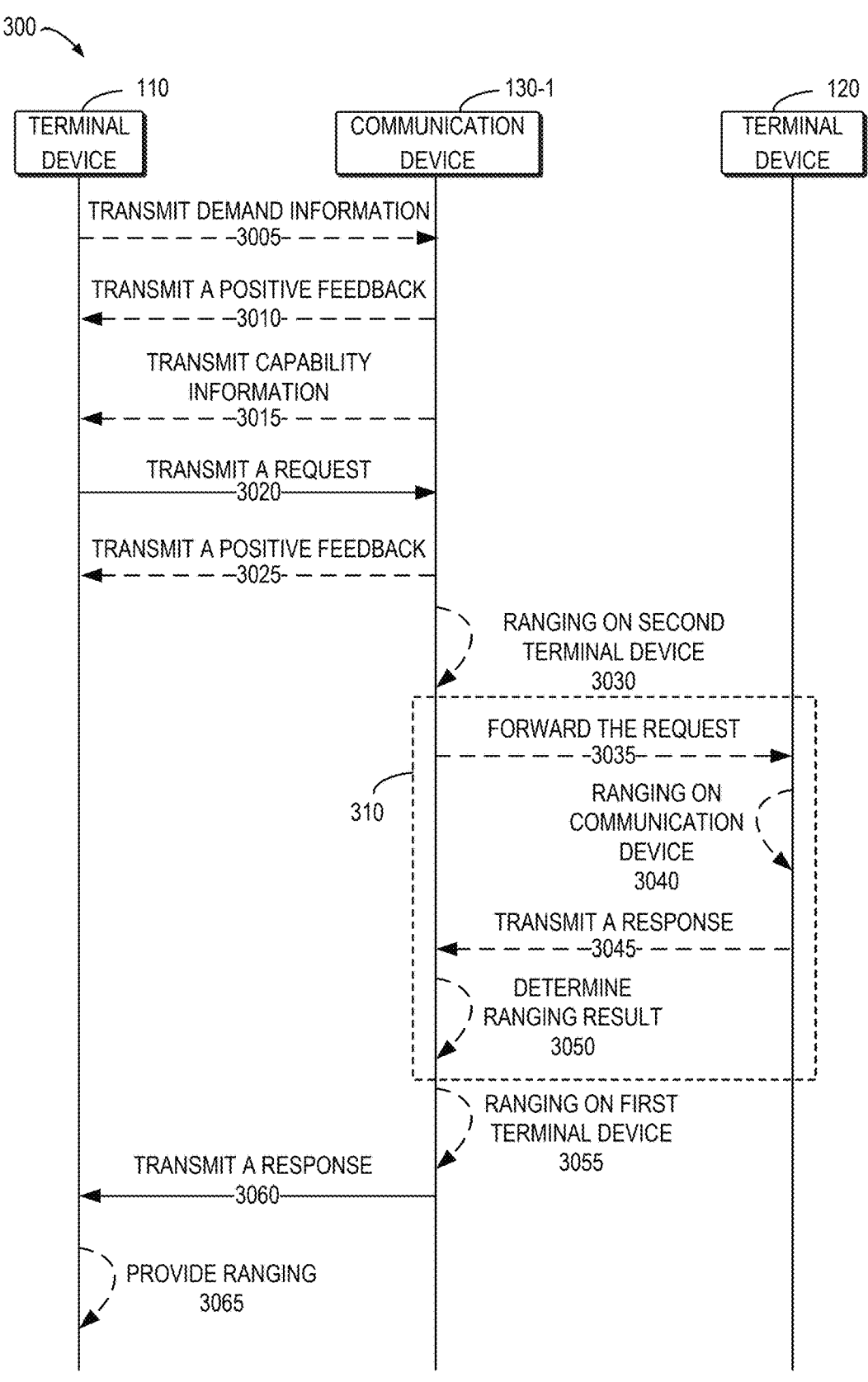
FIG. 3 illustrates a signaling chart demonstrating an example process of assisting in a ranging according to some embodiments of the present disclosure.

Some example processes in accordance with some embodiments of the present disclosure will be described in detail below. Reference is now made to FIG. 3. FIG. 3 illustrates a signaling chart demonstrating an example process 300 according to some embodiments of the present disclosure. For the purpose of this discussion, the process 300 will be described with reference to FIG. 1. Only for the purpose of illustrations, the process 300 can involve the first terminal device 110, the communication device 130-1 and the second terminal device 120 as shown in FIG. 1.

In the process 300, the first terminal device 110 transmits 3020, to the communication device 131-1, a request to assist in a ranging between the first terminal device 110 and a second terminal device 120. For purpose of discussion without any limitation, the request can be also referred to as an "Assistant Ranging Request" in the following.

The first terminal device 110 can transmit the Assistant Ranging Request when a ranging-based service associated with the second terminal device 120 is needed. For example, the first terminal device 110 can be a smart phone of a customer in a supermarket and the second terminal device 120 can be a tracker UE which an item in the supermarket is tagged with. When the customer wants to search for the item, the first terminal device 110 can transmit the Assistant Ranging Request to the communication device 130-1. Alternatively, the first terminal device 110 can transmit the Assistant Ranging Request when it cannot obtain a ranging result of the second terminal device 120. For example, when the second terminal device 120 is located beyond the ERD of the first terminal device 110, the first terminal device 110 can transmit the Assistant Ranging Request to the communication device 130-1.

In some embodiments, the first terminal device 110 can transmit the Assistant Ranging Request to the communication device 130-1 via broadcast. For example, in the embodiments where the communication device 130-1 is a terminal device, the Assistant Ranging Request can be transmitted via sidelink broadcast, for example, on a Physical Sidelink Broadcast Channel (PSBCH). Alternatively, or in addition, in some embodiments, the first terminal device 110 can transmit the Assistant Ranging Request to the communication device 130-1 via a dedicated signaling. In the embodiments where the communication device 130-1 is a network device, the dedicated signaling can be a RRC signaling for example. In the embodiments where the communication device 130-1 is a terminal device, the dedicated signaling can be a PC5-RRC signaling for example.

The Assistant Ranging Request can comprise information useful for assisting in the ranging between the first terminal device 110 and the second terminal device 120. To this end, the Assistant Ranging Request can comprise an identity of the first terminal device 110. The identity of the first terminal device 110 can be a unique identifier of the first terminal device 110 or an identifier of the first terminal device 110 dedicated for ranging. The Assistant Ranging Request can comprise an identity of the second terminal device 120. The identity of the second terminal device 120 can be a unique identifier of the second terminal device 120 or an identifier of the second terminal device 120 dedicated for ranging.

The Assistant Ranging Request can comprise an ERD of the first terminal device 110. The Assistant Ranging Request can comprise one or more preferred directions for assisting in the ranging. The preferred directions can be a potential direction range of the second terminal device 120, which may be a range of direction in which the second terminal device 120 is possibly oriented. The preferred directions can facilitate the communication device 130-1 to find out the second terminal device 120 or to select a further assistant device (e.g., the communication device 130-2) which is possibly located near the second terminal device 120.

The Assistant Ranging Request can comprise an accuracy requirement for the ranging between the first terminal device 110 and the second terminal device 120. The accuracy requirement can be a required accuracy of a distance or a direction (e.g., the azimuth angle, the elevation angle). The required accuracy can be represented in any suitable manner, for example, in percentage, in meter, in degree, or as an area of possibility. The Assistant Ranging Request can comprise a reliability requirement for the ranging between the first terminal device 110 and the second terminal device 120. The reliability requirement can be a required reliability of a distance or a direction (e.g., the azimuth angle, the elevation angle). The required reliability can be represented in any suitable manner, for example, in percentage, in meter, in degree, or as an area of possibility.

The Assistant Ranging Request can comprise a requirement for a movement speed of a communication device assisting in the ranging, i.e., for an assistant device. The requirement for the movement speed can comprise a required absolute movement speed of the assistant device. Alternatively, or in addition, the requirement for the movement speed can comprise a required relative movement speed of the assistant device to the first terminal device 110 for example. If a communication device is moving in the environment 100 in a relative high speed, a ranging result derived by such a communication device would have a limited period of validity. Therefore, the requirement for the movement speed can facilitate the communication device 130-1 to select a further assistant device with an appropriate speed if needed.

In some embodiments, prior to transmission of the Assistant Ranging Request, the first terminal device 110 can find out or discovery the communication device 130-1 for assisting in the ranging, which can be referred to as "assistant device discovery". The assistance device discovery can be implemented in an active manner or in a passive manner.

In some embodiments, the assistance device discovery can be implemented in the active manner. As shown in FIG. 1, the first terminal device 110 can transmit 3005, to the communication device 130-1, demand information concerning the ranging between the first terminal device 110 and the second terminal device 120. The demand information can indicate that the first terminal device 110 needs support for the ranging between the first terminal device 110 and the second terminal device 120. The demand information can be transmitted via broadcast (e.g., sidelink broadcast) to enable the demand information to be received by a plurality of communication devices. Alternatively, or in addition, the demand information can be transmitted via a dedicated signaling to the communication device 130-1. In the embodiments where the communication device 130-1 is a network device, the demand information can be transmitted via a RRC signaling or a non-access stratum (NAS) signaling, for example. In the embodiments where the communication device 130-1 is a terminal device, the demand information can be transmitted via a PC5-RRC signaling for example.

If the communication device 130-1 is able to assist in the ranging, for example the communication device 130-1 is ranging enabled, the communication device 130-1 can transmit 3010 a positive feedback to the first terminal device 110. The positive feedback can indicate a capability of the communication device 130-1 to assist in the ranging. In other words, the positive feedback can indicate that the communication device 130-1 is able to support the ranging between the first terminal device 110 and the second terminal device 120.

The positive feedback can be transmitted via broadcast to the first terminal device 110. In the embodiments where the communication device 130-1 is a network device, the positive feedback can be transmitted via system information broadcast for example. In the embodiments where the communication device 130-1 is a terminal device, the positive feedback can be transmitted via sidelink broadcast for example.

Alternatively, or in addition, the positive feedback can be transmitted via a dedicated signaling to the first terminal device 110. In the embodiments where the communication device 130-1 is a network device, the positive feedback can be transmitted via a RRC signaling or a non-access stratum (NAS) signaling, for example. In the embodiments where the communication device 130-1 is a terminal device, the positive feedback can be transmitted via a PC5-RRC signaling for example.

Alternatively, in some embodiments, the assistance device discovery can be implemented in the passive manner. As shown in FIG. 3, the communication device 130-1 can transmit 3015 capability information to the first terminal device 110. The capability information may indicate that the communication device 130-1 has a capability of ranging assistance. In other words, the capability information can indicate that the communication device 130-1 is able to support a ranging between devices.

The capability information can be transmitted via broadcast to the first terminal device 110. In the embodiments where the communication device 130-1 is a network device, the capability information can be transmitted via system information broadcast for example. In the embodiments where the communication device 130-1 is a terminal device, the capability information can be transmitted via sidelink broadcast for example.

Alternatively, or in addition, the capability information can be transmitted via a dedicated signaling to the first terminal device 110. In the embodiments where the communication device 130-1 is a network device, the capability information can be transmitted via a RRC signaling or a non-access stratum (NAS) signaling, for example. In the embodiments where the communication device 130-1 is a terminal device, the capability information can be transmitted via a PC5-RRC signaling for example.

Although only the communication device 130-1 is described in the assistant device discovery, it is to be understood that a plurality of communication devices can be involved in the assistant device discovery implemented either in the active manner or in the passive manner. The first terminal device 110 can select from the plurality of communication devices an assistant device which satisfies one or more criteria. In other words, the communication device 130-1 can satisfy one or more criteria.

A criterion can be that the communication device 130-1 has a capability to assist in the ranging between the first terminal device 110 and the second terminal device 120. For example, the communication device 130-1 can have transmitted the capability information. Another criterion can be that the communication device 130-1 is in communication with the first terminal device 110. For example, the communication device 130-1 can be in a sidelink connection with the first terminal device 110 or in a RRC connection with the first terminal device 110. A further criterion can be that the communication device 130-1 is located within a ranging distance from the first terminal device 110. For example, communication device 130-1 can be directly ranged by the first terminal device 110. A further criterion can be that a strength of a signal received at the first terminal device 110 from the communication device 130-1 exceeds a threshold. For example, the communication device 130-1 can be discovered by the sidelink discovery. Still a further criterion can be that communication device 130-1 is oriented in the potential direction range of the second terminal device 120. Still a further criterion can be that the communication device 130-1 and the first terminal device 110 belong to a same device group. For example, the communication device 130-1 and the first terminal device 110 can belong to the same UAV swarm. Still a further criterion can be that the communication device 130-1 and the first terminal device 110 are associated with a same communication network. For example, the communication device 130-1 and the first terminal device 110 can belong to a local private network. For another example, the communication device 130-1 can be a network device providing the first terminal device 110 with a network coverage.

In some embodiments, prior to transmitting 3020 the Assistant Ranging Request, the first terminal device 110 may not perform the assistant device discovery as described above. In such embodiments, upon receiving the Assistant Ranging Request from the first terminal device 110, the communication device 130-1 can transmit 3025 a positive feedback to the first terminal device 110. The positive feedback can indicate to the first terminal device 110 that the communication device 130-1 is able to support the ranging between the first terminal device 110 and the second terminal device 120.

Continue with the process 300. Upon receiving the Assistant Ranging Request from the first terminal device 110, the communication device 130-1 tries to obtain ranging information concerning the second terminal device 120. The ranging information can comprise a ranging result for any communication device and the second terminal device 120. For example, the ranging information can comprise a ranging result from the communication device 130-1 to the second terminal device 120. Alternatively, or in addition, the ranging result can comprise a ranging result from the first terminal device 110 to the second terminal device 120.

Figure 4:
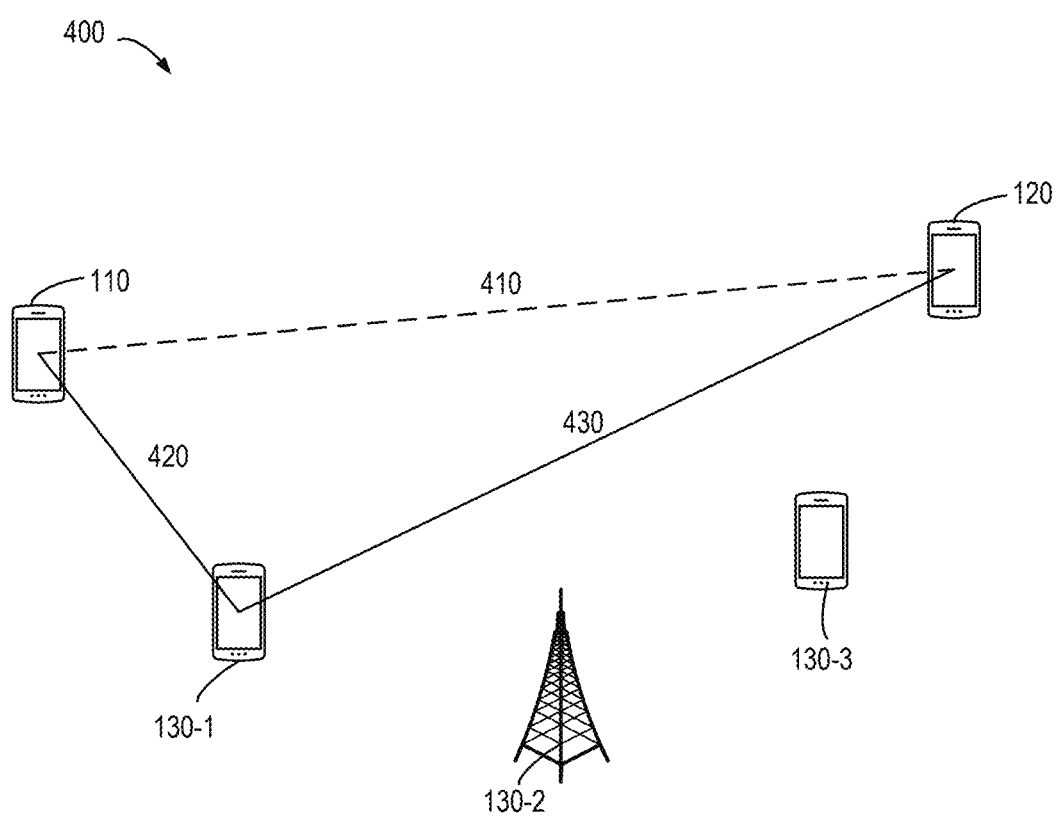
FIG. 4 illustrates a schematic diagram of ranging results in the case of one assistant device according to some embodiments of the present disclosure.

As shown in FIG. 3, in some embodiments, the communication device 130-1 can perform 3030 a ranging operation on the second terminal device 120. As a result, a ranging result for the communication device 130-1 and the second terminal device 120 can be determined. Reference is now made to FIG. 4. FIG. 4 illustrates a schematic diagram 400 of ranging results in the case of one assistant device according to some embodiments of the present disclosure. The communication device 130-1 can determine the ranging result 430 for the communication device 130-1 and the second terminal device 120 by performing the ranging operation on the second terminal device 120. The ranging results 430 can comprise a distance between the communication device 130-1 and the second terminal device 120, an azimuth angle from the communication device 130-1 to the second terminal device 120, and an elevation angle from the communication device 130-1 to the second terminal device 120.

Reference is made back to FIG. 3. In some embodiments, instead of performing the ranging operation on the second terminal device 120, the communication device 130-1 can perform interaction as shown in the block 310 with the second terminal device 120. Specifically, the communication device 130-1 can forward 3035 the Assistant Ranging Request to the second terminal device 120. As compared to the Assistant Ranging Request transmitted by the first terminal device 110, the Assistant Ranging Request forwarded by the communication device 130-1 can further comprise an identity of the communication device 130-1, for example, a unique identifier of the communication device 130-1 or an identifier of the communication device 130-1 dedicated for ranging.

Upon receiving the Assistant Ranging Request from the communication device 130-1, the second terminal device 120 can perform 3040 a ranging operation on the communication device 130-1. As a result, the ranging result 430 for the communication device 130-1 and the second terminal device 120 can be determined. The ranging results 430 can comprise a distance between the communication device 130-1 and the second terminal device 120, an azimuth angle from the second terminal device 120 to the communication device 130-1, and an elevation angle from the second terminal device 120 to the communication device 130-1.

Then, the second terminal device 120 can transmit 3045 a response to the communication device 130-1. The response can include the ranging result 430 for the communication device 130-1 and the second terminal device 120. In some embodiments, the response can further include at least one of an accuracy and a reliability of the ranging result 430. Then, the communication device 130-1 can determine 3050 the ranging result 430 from the response.

As such, the communication device 130-1 can obtain the ranging result 430, either by performing 3030 the ranging operation on the second terminal device 120 or by perform the interaction as shown in block 310 with the second terminal device 120. In some embodiments, the communication device 130-1 can then perform 3055 a ranging operation on the first terminal device 110 to determine a ranging result 420 for the first terminal device 110 and the communication device 130-1. The ranging results 420 can comprise a distance between the communication device 130-1 and the first terminal device 110, an azimuth angle from the communication device 130-1 to the first terminal device 110, and an elevation angle from the communication device 130-1 to the first terminal device 110.

Then, the communication device 130-1 transmits 3060 a response to the Assistant Ranging Request to the first terminal device 110. The response can be referred to as an "Assistant Ranging Response".

The Assistant Ranging Response can be transmitted via broadcast to the first terminal device 110. In the embodiments where the communication device 130-1 is a network device, the Assistant Ranging Response can be transmitted via system information broadcast for example. In the embodiments where the communication device 130-1 is a terminal device, the Assistant Ranging Response can be transmitted via sidelink broadcast for example.

Alternatively, or in addition, the Assistant Ranging Response can be transmitted via a dedicated signaling to the first terminal device 110. In the embodiments where the communication device 130-1 is a network device, the Assistant Ranging Response can be transmitted via a RRC signaling or a NAS signaling, for example. In the embodiments where the communication device 130-1 is a terminal device, the Assistant Ranging Response can be transmitted via a PC5-RRC signaling for example.

In some embodiments, if the communication device 130-1 succeeds in obtaining the ranging information concerning the second terminal device 120, the Assistant Ranging Response can include an indication of acceptance of the Assistant Ranging Request. The Assistant Ranging Response can further include the ranging information, which in this case is associated with the communication device 130-1. In some embodiments, the ranging information can comprise the ranging result 430 for the communication device 130-1 and the second terminal device 120. In some embodiments, the ranging information can further comprise the ranging result 420 for the communication device 130-1 and the first terminal device 110. In some embodiments, the ranging information can comprise a ranging result 410 for the first terminal device 110 and the second terminal device 120. The ranging result 410 can be derived by the communication device 130-1 based on the ranging result 420 and the ranging result 430, as described with reference to FIG. 2.

In addition to the ranging information, the Assistant Ranging Response can further comprise other information related to the ranging assistance. The Assistant Ranging Response can comprise an identity of the second terminal device 120. The identity of the second terminal device 120 can be a unique identifier of the second terminal device 120 or an identifier of the second terminal device 120 dedicated for ranging. The Assistant Ranging Response can comprise an identity of the communication device 130-1. The identity of the communication device 130-1 can be a unique identifier of the communication device 130-1 or an identifier of the communication device 130-1 dedicated for ranging.

The Assistant Ranging Response can comprise an accuracy associated with the ranging information. For example, the Assistant Ranging Response can comprise the accuracy of each ranging result which is comprised in the ranging information, for example, the ranging result 430. The Assistant Ranging Response can comprise a reliability associated with the ranging information. For example, the Assistant Ranging Response can comprise the reliability of each ranging result which is comprised in the ranging information.

The Assistant Ranging Response can comprise a time stamp associated with the ranging information. For example, the Assistant Ranging Response can comprise a time stamp indicating when a ranging result comprised in the ranging information is obtained. Alternatively, or in addition, the Assistant Ranging Response can comprise a time stamp indicating when a ranging result comprised in the ranging information is valid.

The Assistant Ranging Response can comprise a movement speed of the second terminal device 120. For example, the Assistant Ranging Response can comprise an absolute movement speed or a relative movement speed of the second terminal device 120. The Assistant Ranging Response can comprise a movement speed of the communication device 130-1. For example, the Assistant Ranging Response can comprise an absolute movement speed or a relative movement speed of the communication device 130-1.

In some embodiments, if the communication device 130-1 fails in obtaining the ranging information concerning the second terminal device 120, the Assistant Ranging Response can include an indication of rejection of the Assistant Ranging Request. In such embodiments, the Assistant Ranging Response can further include a reason of the rejection. As an example, the reason can be that the communication device 130-1 is unable to perform a ranging operation on the second terminal device 120. As another example, the reason can be that the accuracy requirement or the reliability requirement cannot be fulfilled.

If the Assistant Ranging Response comprises the ranging information, the first terminal device 110 can provide 3065 a ranging with the second terminal device 120 via the communication device 130-1 based on the ranging information. For example, the terminal device 110 can determine the ranging result 410 for the first terminal device 110 and the second terminal device 120. In the embodiments where the ranging information comprises the ranging result 410 determined by the communication device 130-1, the first terminal device 110 can directly obtain the ranging result 410 from the Assistant Ranging Response. In the embodiments where the ranging information comprises the ranging result 430 without the ranging result 420, the first terminal device 110 can perform a ranging operation on the communication device 130-1 to determine the ranging result 420. Then, the first terminal device 110 can derive the ranging result 410 based on the ranging result 420 and the ranging result 430 as described with reference to FIG. 2. In the embodiments where the ranging information comprises both the ranging result 430 and the ranging result 420, the first terminal device 110 can derive the ranging result 410 based on the ranging result 420 and the ranging result 430 as described with reference to FIG. 2.

If the Assistant Ranging Response indicates the rejection of the Assistant Ranging Request, the first terminal device 110 can try to discover another communication device to assist in the ranging. The first terminal device 110 can then transmit the Assistant Ranging Request to the newly discovered communication device.

The example process 300 can be considered as a process of 2-hop assistant ranging. In the example process 300, the communication device 130-1 acts as the assistant device for ranging between the first terminal device 110 and the second terminal device 120. In this way, a ranging service beyond the capability of a single terminal device is enabled with the help of an assistant device (for example, a UE or a BS). The assistant device with a ranging capability, for example a UE or a BS with the ranging capability, can assist in the ranging without RF improvement. As such, the issue of limited ranging distance due to device capabilities or regulations can be alleviated and the application of ranging-based services can thus be extended.

Example Processes Involving More than One Assistant Device

Figure 5:
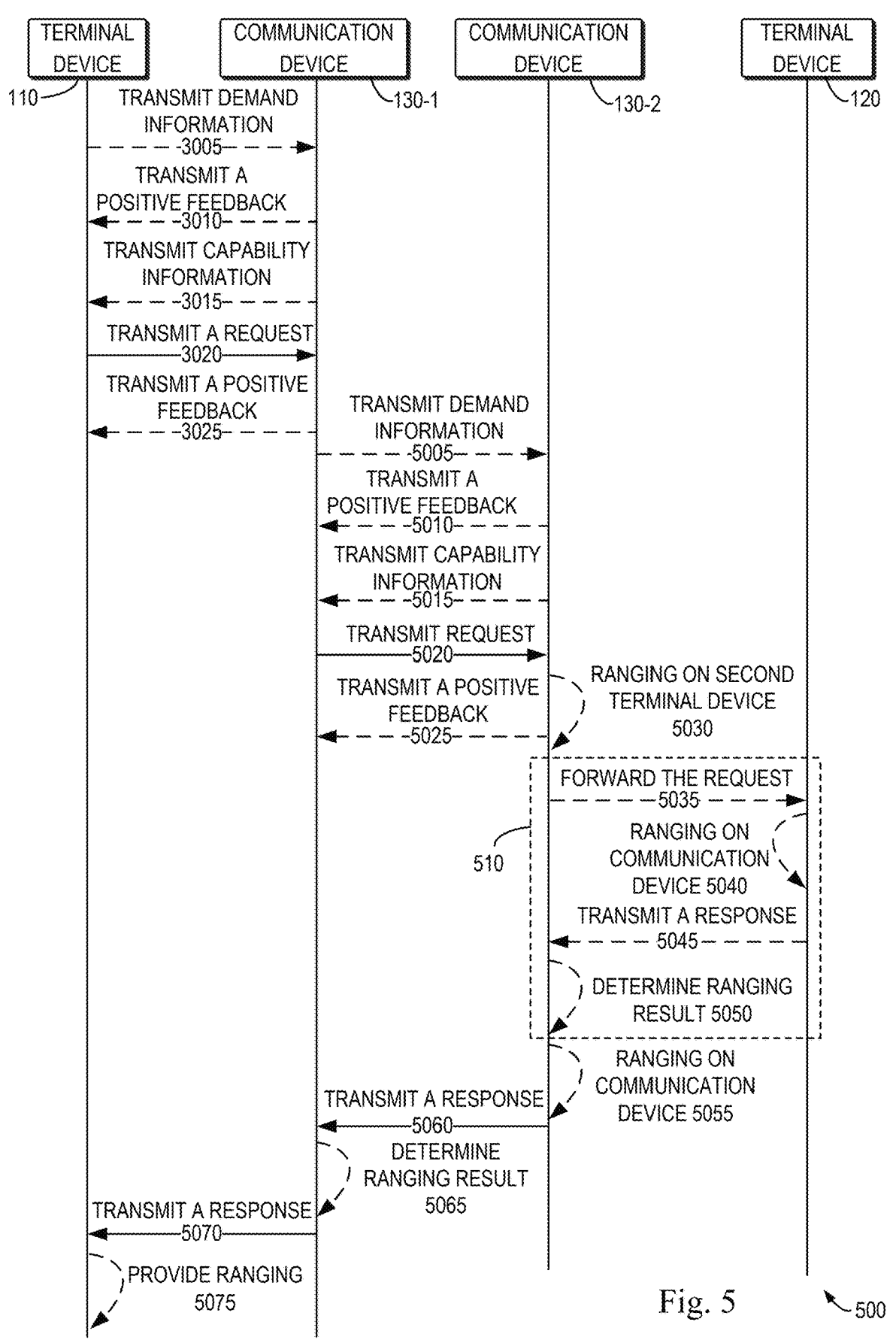
FIG. 5 illustrates a signaling chart demonstrating an example process of assisting in a ranging according to some embodiments of the present disclosure.

In some embodiment, more than one communication device can assist in the ranging between the first terminal device 110 and the second terminal device 120. Reference is now made to FIG. 5. FIG. 5 illustrates a signaling chart demonstrating an example process 500 according to some embodiments of the present disclosure. For the purpose of this discussion, the process 500 will be described with reference to FIG. 1. Only for the purpose of illustrations, the process 500 can involve the first terminal device 110, the communication device 130-1, the communication device 130-2 and the second terminal device 120 as shown in FIG. 1. Acts with the same reference signs (i.e., 3005, 3010, 3015, and 3025) as the process 300 are those described above with reference to FIG. 3 and thus description thereof is not repeated here.

As described with reference to FIG. 3, the first terminal device 110 transmits 3020 the Assistant Ranging Request to the communication device 130-1. Upon receiving the Assistant Ranging Request, the communication device 130-1 tries to obtain the ranging information concerning the second terminal device 120. As shown in the example process 500, the communication device 130-1 transmits 5020, to the communication device 130-2, an Assistant Ranging Request to assist in ranging between the communication device 130-1 and the second terminal device 120. For example, if the communication device 130-1 is unable to perform a ranging operation on the second terminal device 120, the communication device 130-1 can forward to the communication device 130-2 the Assistant Ranging Request which is received from the first terminal device 110. As compared to the Assistant Ranging Request transmitted by the first terminal device 110, the Assistant Ranging Request forwarded by the communication device 130-1 can further comprise an identity of the communication device 130-1, for example, a unique identifier of the communication device 130-1 or an identifier of the communication device 130-1 dedicated for ranging. The Assistant Ranging Request can be transmitted to the communication device 130-2 via broadcast or dedicated signaling.

In some embodiments, prior to transmitting the Assistant Ranging Request, the communication device 130-1 can perform the assistant device discovery to discover the communication device 130-2 for assisting in the ranging. As described with FIG. 3, the assistance device discovery can be implemented in an active manner or in a passive manner.

In some embodiments, the assistance device discovery can be implemented in the active manner. As shown in FIG. 5, the communication device 130-1 can transmit 5005, to the communication device 130-2, demand information concerning the ranging between the communication device 130-1 and the second terminal device 120. The demand information can indicate that the communication device 130-1 needs support for the ranging between the communication device 130-1 and the second terminal device 120. The demand information can be transmitted via broadcast (e.g., sidelink broadcast) to enable the demand information to be received by a plurality of communication devices. Alternatively, or in addition, the demand information can be transmitted via a dedicated signaling to the communication device 130-1. In the embodiments where the communication device 130-1 is a terminal device and the communication device 130-2 is a network device, the demand information can be transmitted via a RRC signaling or a NAS signaling, for example. In the embodiments where both the communication devices 130-1 and 130-2 are terminal devices, the demand information can be transmitted via a PC5-RRC signaling for example. In the embodiments where both the communication devices 130-1 and 130-2 are network devices, the demand information can be transmitted via a NG interface or an X2/Xn interface.

If the communication device 130-2 is able to assist in the ranging, for example the communication device 130-2 is ranging enabled, the communication device 130-2 can transmit 5010 a positive feedback to the communication device 130-1. The positive feedback can indicate a capability of the communication device 130-2 to assist in the ranging. In other words, the positive feedback can indicate that the communication device 130-2 is able to support the ranging between the communication device 130-1 and the second terminal device 120.

The positive feedback can be transmitted via broadcast to the communication device 130-1. In the embodiments where both the communication devices 130-1 and 130-2 are terminal devices, the positive feedback can be transmitted via sidelink broadcast for example.

Alternatively, or in addition, the positive feedback can be transmitted via a dedicated signaling to the communication devices 130-1. In the embodiments where the communication device 130-1 is a terminal device and the communication device 130-2 is a network device, the positive feedback can be transmitted via a RRC signaling or a NAS signaling, for example. In the embodiments where both the communication devices 130-1 and 130-2 are terminal devices, the positive feedback can be transmitted via a PC5-RRC signaling for example. In the embodiments where both the communication devices 130-1 and 130-2 are network devices, the demand information can be transmitted via a NG interface or an X2/Xn interface.

Alternatively, in some embodiments, the assistance device discovery can be implemented in the passive manner. As shown in FIG. 5, the communication device 130-2 can transmit 5015 capability information to the communication device 130-1. The capability information may indicate that the communication device 130-2 has a capability of ranging assistance. In other words, the capability information can indicate that the communication device 130-2 is able to support a ranging between devices.

The capability information can be transmitted via broadcast to the communication device 130-1. For example, in the embodiments where both the communication devices 130-1 and 130-2 are terminal devices, the capability information can be transmitted via sidelink broadcast for example.

Alternatively, or in addition, the capability information can be transmitted via a dedicated signaling to the communication devices 130-1. In the embodiments where the communication device 130-1 is a terminal device and the communication device 130-2 is a network device, the capability information can be transmitted via a RRC signaling or a NAS signaling, for example. In the embodiments where both the communication devices 130-1 and 130-2 are terminal devices, the capability information can be transmitted via a PC5-RRC signaling for example. In the embodiments where both the communication devices 130-1 and 130-2 are network devices, the capability information can be transmitted via a NG interface or an X2/Xn interface.

Although only the communication device 130-2 is described in the assistant device discovery, it is to be understood that a plurality of communication devices can be involved in the assistant device discovery implemented either in the active manner or in the passive manner. The communication device 130-1 can select from the plurality of communication devices an assistant device which satisfies one or more criteria. In other words, the communication device 130-2 can satisfy one or more criteria.

A criterion can be that the communication device 130-2 has a capability to assist in the ranging between the communication device 120-1 and the second terminal device 120. For example, the communication device 130-2 can have transmitted the capability information. Another criterion can be that the communication device 130-2 is in communication with the communication device 130-1. For example, the communication device 130-2 can be in a sidelink connection with the communication device 130-1 or in a RRC connection with the communication device 130-1. A further criterion can be that the communication device 130-2 is located within a ranging distance from the communication device 130-1. For example, communication device 130-2 can be directly ranged by the communication device 130-1. A further criterion can be that a strength of a signal received at the communication device 130-1 from the communication device 130-2 exceeds a threshold. For example, the communication device 130-2 can be discovered by the sidelink discovery. Still a further criterion can be that communication device 130-2 is oriented in the potential direction range of the second terminal device 120. Still a further criterion can be that the communication device 130-2 and the communication device 130-1 belong to a same device group. For example, the communication device 130-1 and the communication device 130-2 can belong to the same UAV swarm. Still a further criterion can be that the communication device 130-2 and the communication device 130-1 are associated with a same communication network. For example, the communication device 130-2 and the communication device 130-1 can belong to a local private network. For another example, the communication device 130-2 can be a network device providing the communication device 130-1 with a network coverage. For another example, the communication device 130-2 can be a terminal device served by the communication device 130-1, which is a network device.

In some embodiments, prior to transmitting the Assistant Ranging Request, the communication device 130-1 may not perform the assistant device discovery as described above. In such embodiments, upon receiving the Assistant Ranging Request from the communication device 130-1, the communication device 130-2 can transmit 5025 a positive feedback to the communication device 130-1. The positive feedback can indicate to the communication device 130-1 that the communication device 130-2 is able to support the ranging between the communication device 130-1 and the second terminal device 120.

Continue with the process 500. Upon receiving the Assistant Ranging Request from the communication device 130-1, the communication device 130-2 tries to obtain ranging information concerning the second terminal device 120. The ranging information can comprise a ranging result for any communication device and the second terminal device 120. For example, the ranging information can comprise a ranging result from the communication device 130-2 to the second terminal device 120. Alternatively, or in addition, the ranging information can comprise a ranging result from the communication device 130-1 to the second terminal device 120.

Figure 6:
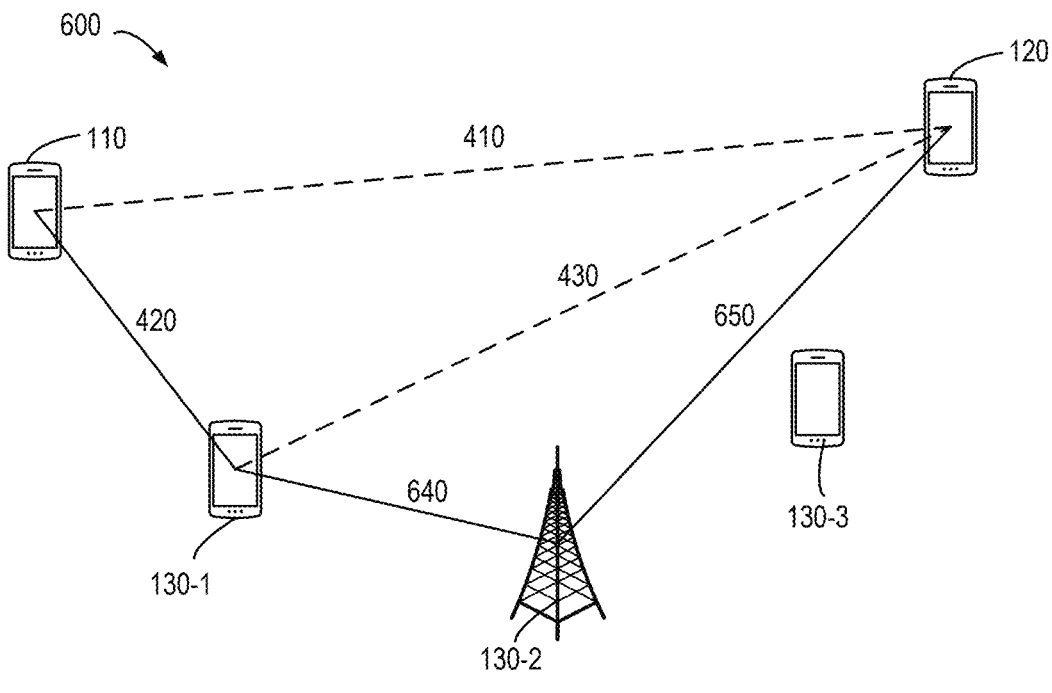
FIG. 6 illustrates a schematic diagram of ranging results in the case of two assistant devices according to some embodiments of the present disclosure.

As shown in FIG. 5, in some embodiments, the communication device 130-2 can perform 5030 a ranging operation on the second terminal device 120. As a result, a ranging result for the communication device 130-2 and the second terminal device 120 can be determined. Reference is now made to FIG. 6. FIG. 6 illustrates a schematic diagram 600 of ranging results in the case of more than one assistant device according to some embodiments of the present disclosure. The communication device 130-2 can determine the ranging result 650 for the communication device 130-2 and the second terminal device 120 by performing the ranging operation on the second terminal device 120. The ranging result 650 can comprise a distance between the communication device 130-2 and the second terminal device 120, an azimuth angle from the communication device 130-2 to the second terminal device 120, and an elevation angle from the communication device 130-2 to the second terminal device 120.

Reference is made back to FIG. 5. In some embodiments, instead of performing the ranging operation on the second terminal device 120, the communication device 130-2 can perform interaction as shown in the block 510 with the second terminal device 120. Specifically, the communication device 130-2 can forward 5035 the Assistant Ranging Request to the second terminal device 120. As compared to the Assistant Ranging Request transmitted by the communication device 130-1, the Assistant Ranging Request forwarded by the communication device 130-2 can further comprise an identity of the communication device 130-2, for example, a unique identifier of the communication device 130-2 or an identifier of the communication device 130-2 dedicated for ranging.

Upon receiving the Assistant Ranging Request from the communication device 130-2, the second terminal device 120 can perform 5040 a ranging operation on the communication device 130-2. As a result, the ranging result 650 for the communication device 130-2 and the second terminal device 120 can be determined. The ranging result 650 can comprise a distance between the communication device 130-2 and the second terminal device 120, an azimuth angle from the second terminal device 120 to the communication device 130-2, and an elevation angle from the second terminal device 120 to the communication device 130-2.

Then, the second terminal device 120 can transmit 5045 a response to the communication device 130-2. The response can include the ranging result 650 for the communication device 130-2 and the second terminal device 120. In some embodiments, the response can further include at least one of an accuracy and a reliability of the ranging result 650. Then, the communication device 130-2 can determine 5050 the ranging result 650 from the response.

As such, the communication device 130-2 can obtain the ranging result 650, either by performing 5030 the ranging operation on the second terminal device 120 or by perform the interaction as shown in block 510 with the second terminal device 120. In some embodiments, the communication device 130-2 can then perform 5055 a ranging operation on the communication device 130-1 to determine a ranging result 640 for the communication device 130-1 and the communication device 130-2. The ranging result 640 can comprise a distance between the communication device 130-2 and the communication device 130-1, an azimuth angle from the communication device 130-2 to the communication device 130-1, and an elevation angle from the communication device 130-2 to the communication device 130-1.

Then, the communication device 130-2 transmits 5060 the Assistant Ranging Response to the communication device 130-1. The Assistant Ranging Response can be transmitted via broadcast to the communication device 130-1. For example, in the embodiments where both the communication devices 130-1 and 130-2 are terminal devices, the Assistant Ranging Response can be transmitted via sidelink broadcast for example.

Alternatively, or in addition, the Assistant Ranging Response can be transmitted via a dedicated signaling to the communication devices 130-1. In the embodiments where the communication device 130-1 is a terminal device and the communication device 130-2 is a network device, the Assistant Ranging Response can be transmitted via a RRC signaling or a NAS signaling, for example. In the embodiments where both the communication devices 130-1 and 130-2 are terminal devices, the Assistant Ranging Response can be transmitted via a PC5-RRC signaling for example. In the embodiments where both the communication devices 130-1 and 130-2 are network devices, the Assistant Ranging Response can be transmitted via a NG interface or an X2/Xn interface.

In some embodiments, if the communication device 130-2 succeeds in obtaining the ranging information concerning the second terminal device 120, the Assistant Ranging Response can include an indication of acceptance of the Assistant Ranging Request. The Assistant Ranging Response can further include the ranging information, which in this case is associated with the communication device 130-2. In some embodiments, the ranging information can comprise the ranging result 650 for the communication device 130-2 and the second terminal device 120. In some embodiments, the ranging information can further comprise the ranging result 640 for the communication device 130-2 and the communication device 130-1. In some embodiments, the ranging information can comprise a ranging result 430 for the communication device 130-1 and the second terminal device 120. The ranging result 430 can be derive by the communication device 130-2 based on the ranging result 640 and the ranging result 650, as described with reference to FIG. 2.

In addition to the ranging information, the Assistant Ranging Response can further comprise other information related to the ranging assistance. The Assistant Ranging Response can comprise an identity of the second terminal device 120. The identity of the second terminal device 120 can be a unique identifier of the second terminal device 120 or an identifier of the second terminal device 120 dedicated for ranging. The Assistant Ranging Response can comprise an identity of the communication device 130-2. The identity of the communication device 130-2 can be a unique identifier of the communication device 130-2 or an identifier of the communication device 130-2 dedicated for ranging.

The Assistant Ranging Response can comprise an accuracy associated with the ranging information. For example, the Assistant Ranging Response can comprise the accuracy of each ranging result which is comprised in the ranging information. The Assistant Ranging Response can comprise a reliability associated with the ranging information. For example, the Assistant Ranging Response can comprise the reliability of each ranging result which is comprised in the ranging information.

The Assistant Ranging Response can comprise a time stamp associated with the ranging information. For example, the Assistant Ranging Response can comprise a time stamp indicating when a ranging result comprised in the ranging information is obtained. Alternatively, or in addition, the Assistant Ranging Response can comprise a time stamp indicating when a ranging result comprised in the ranging information is valid.

The Assistant Ranging Response can comprise a movement speed of the second terminal device 120. For example, the Assistant Ranging Response can comprise an absolute movement speed or a relative movement speed of the second terminal device 120. The Assistant Ranging Response can comprise a movement speed of the communication device 130-2. For example, the Assistant Ranging Response can comprise an absolute movement speed or a relative movement speed of the communication device 130-2.

In some embodiments, if the communication device 130-2 fails in obtaining the ranging information concerning the second terminal device 120, the Assistant Ranging Response can include an indication of rejection of the Assistant Ranging Request. In such embodiments, the Assistant Ranging Response can further include a reason of the rejection. As an example, the reason can be that the communication device 130-2 is unable to perform a ranging operation on the second terminal device 120. As another example, the reason can be that the accuracy requirement or the reliability requirement cannot be fulfilled.

Then, the communication device 130-1 transmits 5070 the Assistant Ranging Response to the first terminal device 110. As compared with the Assistant Ranging Response transmitted by the communication device 130-2, the Assistant Ranging Response transmitted by the communication device 130-1 can further comprise information about the communication device 130-1. For example, the Assistant Ranging Response transmitted by the communication device 130-1 can further comprise an identity of the communication device 130-1. For another example, the Assistant Ranging Response transmitted by the communication device 130-1 can further comprise a movement speed of the communication device 130-1.

In some embodiments, the communication device 130-1 can transmit the Assistant Ranging Response to the first terminal device 110 without adding another ranging result into the Assistant Ranging Response. For example, in the embodiments where the ranging information comprises the ranging result 430 derived by the communication device 130-2, the communication device 130-1 can transmit the Assistant Ranging Response to the first terminal device 110 without adding another ranging result into the Assistant Ranging Response. For another example, in the embodiments where the ranging information comprises the ranging results 640 and 650, the communication device 130-1 can transmit the Assistant Ranging Response to the first, terminal device 110 without adding another ranging result into the Assistant Ranging Response.

Alternatively, in some embodiments, the communication device 130-1 can determine 5065 at least one further ranging result and add the at least one further ranging result into the Assistant Ranging Response. For example, in the embodiments where the ranging information comprises the ranging results 640 and 650 without the ranging result 430, the communication device 130-1 can derive the ranging result 430 based on the ranging results 640 and 650 as described with reference to FIG. 2. Then, the communication device 130-1 can add the ranging result 430 into the Assistant Ranging Response before transmission. Additionally, in some embodiments, the communication device 130-1 can perform a ranging operation on the first terminal device 110 to determine the ranging result 420 and add the ranging result 420 into the Assistant Ranging Response. In some embodiments, the communication device 130-1 can derive the ranging result 410 for the first terminal device 110 and the second terminal device 120 based on the ranging results 420 and 430 as described with reference to FIG. 2. Then, the communication device 130-1 can add the ranging result 410 into the Assistant Ranging Response.

Upon receiving the Assistant Ranging Response from the communication device 130-1, the first terminal device 110 can process the Assistant Ranging Response. If the Assistant Ranging Response comprises the ranging information, the first terminal device 110 can provide 5075 a ranging with the second terminal device 120 via the communication device 130-1 based on the ranging information. For example, the terminal device 110 can determine the ranging result 410 for the first terminal device 110 and the second terminal device 120. In the embodiments where the ranging information comprises the ranging result 410 derived by the communication device 130-1, the first terminal device 110 can directly obtain the ranging result 410 from the Assistant Ranging Response. In the embodiments where the ranging information comprises the ranging result 430 without the ranging result 420, the first terminal device 110 can perform a ranging operation on the communication device 130-1 to determine the ranging result 420. Then, the first terminal device 110 can derive the ranging result 410 based on the ranging result 420 and the ranging result 430 as described with reference to FIG. 2. In the embodiments where the ranging information comprises both the ranging result 430 and the ranging result 420, the first terminal device 110 can derive the ranging result 410 based on the ranging result 420 and the ranging result 430 as described with reference to FIG. 2.

In the embodiments where the ranging information comprises the ranging results 420, 640 and 650 without the ranging result 430, the first terminal device 110 can derive the ranging result 410 based on the ranging results 420, 640 and 650. For example, the first terminal device 110 can first derive the ranging result 430 based on the ranging results 640 and 650. The first terminal device 110 can then derive the ranging result 410 based on the ranging results 410 and 420.

If the Assistant Ranging Response indicates the rejection of the Assistant Ranging Request, the first terminal device 110 can try to discover another communication device to assist in the ranging. The first terminal device 110 can then transmit the Assistant Ranging Request to the newly discovered communication device.

The example process 500 can be considered as a process of multi-hop assistant ranging. In the example process 500, both the communication device 130-1 and the communication device 130-2 act as assistant devices for the ranging between the first terminal device 110 and the second terminal device 120. With the help of more than one assistant device (for example, more than one UE or BS), the application of ranging-based services can be further extended.

Figure 7:
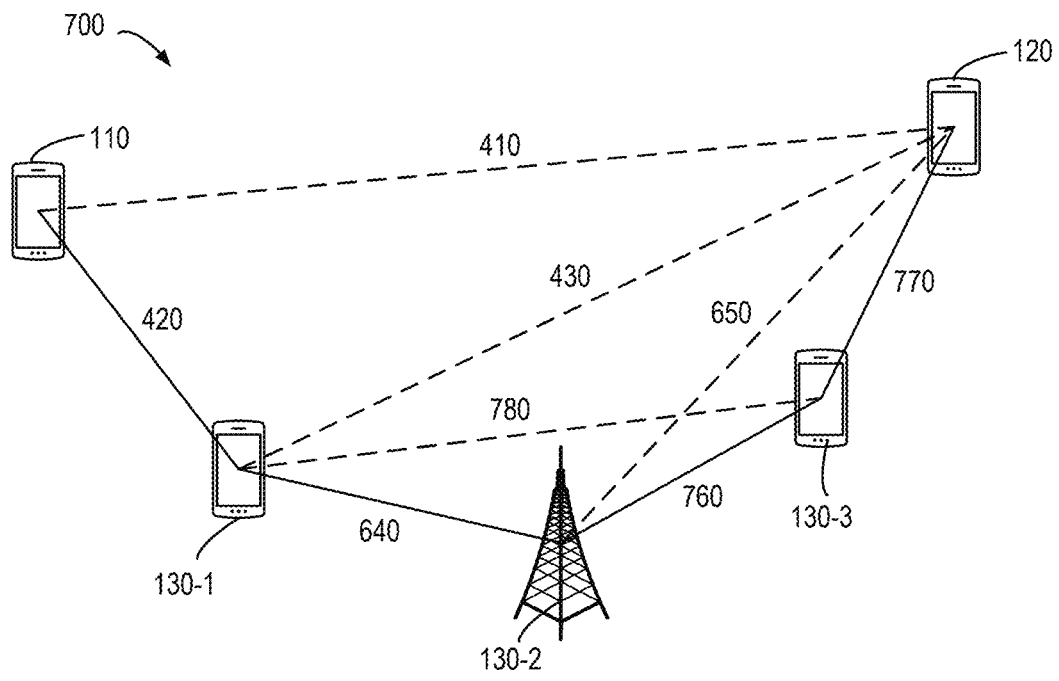
FIG. 7 illustrates a schematic diagram of ranging results in the case of three assistant devices according to some embodiments of the present disclosure.

Reference is now made to FIG. 7. FIG. 7 illustrates a schematic diagram 700 of ranging results in the case of three assistant devices according to some embodiments of the present disclosure. The schematic diagram 700 demonstrates embodiments where the communication devices 130-1, 130-2 and 130-3 act as assistant devices for the ranging between the first terminal device 110 and the second terminal device 120. Interaction between the first terminal device 110, the communication devices 130-1, 130-2 and 130-3 and the second terminal device 120 can be similar to the interaction shown in FIG. 5. As compared with FIG. 6, in such embodiments, a ranging result 760 for the communication device 130-2 and the communication device 130-3 can be determined based on a ranging operation performed by the communication device 130-2 or the communication device 130-3. A ranging result 770 for the second terminal device 120 and the communication device 130-3 can be determined based on a ranging operation performed by the second terminal device 120 or the communication device 130-3. As such, the ranging result 410 can be derived based on the ranging results 420, 640, 760 and 770.

The ranging result 410 can be derived in a variety of ways. As an example, the ranging result 650 can be derived based on the ranging results 760 and 770 as described with reference to FIG. 2. Then, the ranging result 430 can be derived based on the ranging results 650 and 640 as described with reference to FIG. 2. As a result, the ranging result 410 can be derived based on the ranging results 420 and 430 as described with reference to FIG. 2.

As another example, a ranging result 780 for the communication device 130-1 and the communication device 130-3 can be derived based on the ranging results 640 and 760 as described with reference to FIG. 2. Then, the ranging result 430 can be derived based on the ranging results 780 and 770 as described with reference to FIG. 2. As a result, the ranging result 410 can be derived based on the ranging results 420 and 430 as described with reference to FIG. 2.

As can be seen from the foregoing, in FIGS. 4, 6 and 7, ranging results represented by solid lines can be those directly determined by a ranging operation and thus can be referred to as direct ranging results. Ranging results represented by dash lines can be those derived from other ranging results and thus can be referred to as indirect ranging results. Derivation of the indirect ranging results represented by dash lines can be performed by a single device or distributed across a plurality of devices.

In some embodiments, the derivation of all the indirect ranging results can be performed by the first terminal device 110. In such embodiments, the Assistant Ranging Response received by the first terminal device 110 can comprise all the direct ranging results, for example, the ranging results 420, 640, 760 and 770 as shown in FIG. 7. To this end, each assistant device can include in the Assistant Ranging Response a direct ranging result for the assistant device and another device.

In some embodiments, the derivation of all the indirect ranging results can be performed by the last assistance device, for example, the communication device 130-2 in the case of FIG. 6, the communication device 130-3 in the case of FIG. 6. In such embodiments, the last assistance device can derive the ranging result 410 based on the direct ranging results. For example, in the case of FIG. 7, the communication device 130-3 can derive the ranging result 410 based on the ranging results 420, 640, 760 and 770.

In some embodiments, the derivation of the indirect ranging results can be distributed among at least some of the observer terminal device and the assistance devices. In such embodiments, each assistance device can derive the ranging result for that assistance device and the target terminal device. For example, in the case of FIG. 7, the communication device 130-2 can derive the ranging result 650 based on the ranging results 760 and 770. The communication device 130-1 can derive the ranging result 430 based on the ranging results 640 and 650.

Example Methods

FIG. 8 illustrates a flowchart of an example method 800 according to some embodiments of the present disclosure. The method 800 can be performed by a first communication device, for example, the first terminal device 110 or the communication device 130 as shown in FIG. 1. It is to be understood that the method 800 can include additional blocks not shown and/or can omit some blocks as shown, and the scope of the present disclosure is not limited in this regard.

At block 810, the first communication device transmits, to a second communication device, a request to assist in a ranging between the first communication device and a third communication device. The first communication device can be any of the first terminal device 110 and the communication device 130 as shown in FIG. 1.

In some embodiments, the first communication device can be the first terminal device 110, the second communication device can be the communication device 130-1 and the third communication device can be the second terminal device 120. For example, if a ranging based service is needed, the first terminal device 110 can transmit the Assistant Ranging Request to the communication device 130-1. Alternatively, if the first terminal device 110 is unable to perform a ranging operation on the second terminal device 120, the first terminal device 110 can transmit the Assistant Ranging Request to the communication device 130-1.

Alternatively, in some embodiments, the first communication device can be the communication device 130-1, the second communication device can be the communication device 130-2 and the third communication device can be the second terminal device 120. For example, if the communication device 130-1 receives from the first terminal device 110 an Assistant Ranging Request to assist in ranging between the first terminal device 110 and the second device 120 but the communication device 130-1 is unable to perform a ranging operation on the second terminal device

120, the communication device 130-1 can transmit an Assistant Ranging Request to the communication device 130-2 to assist in a ranging between the communication device 130-1 and the second terminal device 120.

In some embodiments, prior to transmitting the request, the first communication device can perform assistance device discovery in an active manner. The first communication device can transmit, to the second communication device, demand information concerning the ranging between the first and third communication devices. In response to receiving from the second communication device 130 a positive feedback, the first communication device can transmit the request to the second communication device. The positive feedback can indicate a capability of the second communication device to assist in the ranging.

In some embodiments, prior to transmitting the request, the first communication device can perform assistance device discovery in a passive manner. The first communication device can transmit the request to the second communication device in response to receiving information from the second communication device. The information can indicate that the second communication device has a capability to assist in the ranging.

In some embodiments, the second communication device can satisfy at least one criterion. As an example, the second communication device has a capability to assist in the ranging between the first and third communication devices. As another example, the second communication device is in communication with the first communication device. As another example, the second communication device is located within a ranging distance from the first communication device. As a further example, a strength of a signal received by the first communication device from the second communication device exceeds a threshold. As a further example, the second communication device is oriented in a potential direction range of the third communication device. As a further example, the first and second communication devices belong to a same device group. As a further example, the first and second communication devices are associated with a same communication network.

In some embodiments, the request to assist in the ranging between the first and third communication devices can comprise an identity of the first communication device. Alternatively, or in addition, the request can comprise an identity of the third communication device, for example, the second terminal device 120. Alternatively, or in addition, the request can comprise an effective ranging distance of the first communication device. Alternatively, or in addition, the request can comprise a potential direction range of the third communication device, for example, the second terminal device 120. Alternatively, or in addition, the request can comprise an accuracy requirement for the ranging between the first and third communication devices. Alternatively, or in addition, the request can comprise a reliability requirement for the ranging. Alternatively, or in addition, the request can comprise a requirement for a movement speed of the second communication device assisting in the ranging.

At block 820, the first communication device receives a response to the request from the second communication device. For example, the first terminal device 110 can receive the Assistant Ranging Response from the communication device 130-1. For another example, the communication device 130-1 can receive the from the communication device 130-2.

At block 830, based on ranging information comprised in the response, the first communication device provides a first ranging with the third communication device via the second communication device. The ranging information is associated with the second communication device for assisting with the ranging between the first and third communication devices.

In some embodiments, the ranging information comprised in the response is further associated with a fourth communication device for assisting in the ranging between the first and second communication devices. For example, in the embodiments where the second communication device is the communication device 130-1, the fourth communication device can be the communication device 130-2. In this situation, the ranging information can comprise the ranging result 650 for the communication device 130-2 and the second terminal device 120.

In some embodiments, the response received from the second communication device further comprises at least one of: an identity of the third communication device (for example, the second terminal device 120), an identity of the second communication device assisting in the ranging, an accuracy associated with the ranging information, a reliability associated with the ranging information, a time stamp associated with the ranging information, a movement speed of the third communication device, or a movement speed of the second communication device assisting in the ranging.

In some embodiments, if the response indicates a rejection of the request, the first communication device can retransmit the request to another communication device that is different from the second communication device. For example, in the embodiments where the first communication device is the first terminal device 110 and the second communication device is the communication device 130-1, if the request is rejected by the communication device 130-1, the first terminal device 110 can transmit the request to the communication device 130-2.

Figure 9:
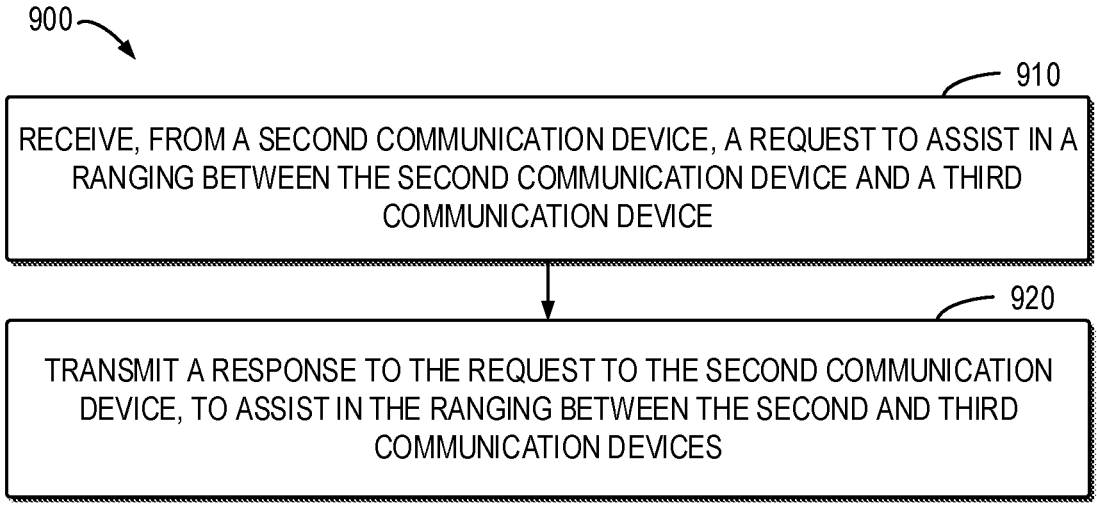
FIG. 9 illustrates a flowchart of an example method according to some embodiments of the present disclosure.

FIG. 9 illustrates a flowchart of an example method 900 according to some embodiments of the present disclosure. The method 900 can be performed by any of the communication devices 130 as shown in FIG. 1. It is to be understood that the method 900 can include additional blocks not shown and/or can omit some blocks as shown, and the scope of the present disclosure is not limited in this regard.

At block 910, a first communication device receives, from a second communication device, a request to assist in a ranging between the second communication device and a third communication device. In some embodiment, the first communication device can be the communication device 130-1, the second communication device can be the first terminal device 110 and the third communication device can be second terminal device 120. In some embodiments, the first communication device can be the communication device 130-2, the second communication device can be communication device 130-1 and the third communication device can be second terminal device 120.

In some embodiment, the first communication device can receive, from the second communication device, demand information concerning the ranging between the second and third communication devices. The first communication device can transmit, to the second communication device, a positive feedback indicating a capability of the first communication device to assist in the ranging. In some embodiment, the first communication device can transmit, to the second communication device, information indicating that the first communication device has a capability to assist in the ranging between the second and third communication devices.

In some embodiments, the request can comprise an identity of the first communication device. Alternatively, or in addition, the request can comprise an identity of the second communication device. Alternatively, or in addition, the request can comprise an identity of the third communication device, for example, the second terminal device 120. Alternatively, or in addition, the request can comprise an effective ranging distance of the second communication device. Alternatively, or in addition, the request can comprise a potential direction range of the third communication device. Alternatively, or in addition, the request can comprise an accuracy requirement for the ranging. Alternatively, or in addition, the request can comprise a reliability requirement for the ranging. Alternatively, or in addition, the request can comprise a requirement for a movement speed of the second communication device assisting in the ranging.

At block 920, the first communication device transmits a response to the request to the second communication device, to assist in the ranging between the second and third communication devices. The response comprises ranging information associated with the first communication device. The ranging information is used for assisting with a first ranging between the second and third communication devices via the first communication device.

In some embodiment, the ranging information comprised in the response can be further associated with a fourth communication device for assisting in the ranging between the second and third communication devices. For example, the ranging information can comprise a ranging result for the fourth and third communication device. In the embodiments where the first communication device is the communication device 130-1 and the second communication device is the first terminal device 110, the ranging information can be further associated with the communication device 130-2. The ranging information can comprise the ranging result 650 for the communication device 130-2 and the second terminal device 120.

In some embodiments, the first communication device can satisfy at least one criterion. As an example, the first communication device has a capability to assist in the ranging between the second and third communication devices. As another example, the first communication device is in communication with the second communication device. As another example, the first communication device is located within a ranging distance from the second communication device. As a further example, a strength of a signal received at the second communication device from the first communication device exceeds a threshold. As a further example, the first communication device is oriented in a potential direction range of the third communication device, for example, the second terminal device 120. As a further example, the first communication device and the second communication device belong to a same device group. As a further example, the first communication device and the second communication device are associated with a same communication network.

In some embodiments, the response further comprises at least one of: an identity of the third communication device, an identity of the first communication device, an accuracy associated with the ranging information, a reliability associated with the ranging information, a time stamp associated with the ranging information, a movement speed of the first communication device, or a movement speed of the first communication device.

In some embodiment, if the first communication device fails in obtaining the ranging information, the first communication device can transmit to the second communication device a response to the request indicating a rejection of the request.

Example Apparatus

Figure 10:
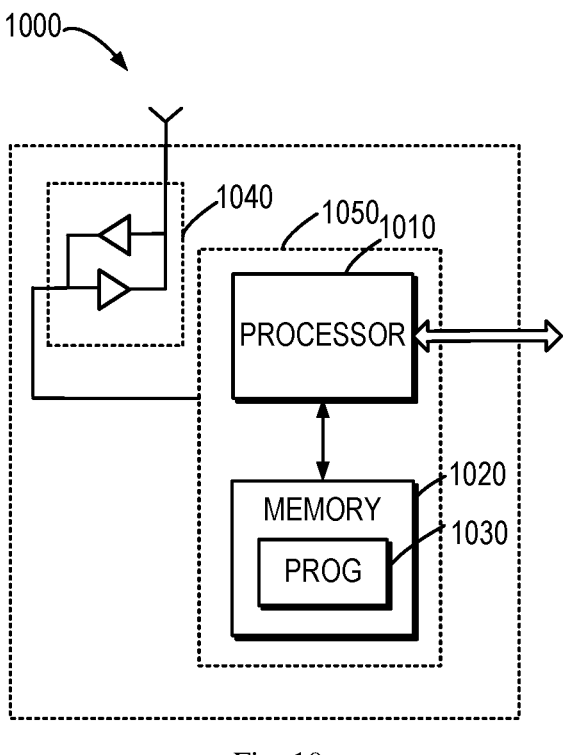
FIG. 10 is a simplified block diagram of an apparatus that is suitable for implementing embodiments of the present disclosure.

FIG. 10 is a simplified block diagram of an apparatus 1000 that is suitable for implementing embodiments of the present disclosure. The apparatus 1000 can be considered as a further example implementation of the first terminal device 110, the communication devices 130, or the second terminal device 120 as shown in FIG. 1. Accordingly, the apparatus 1000 can be implemented at or as at least a part of the first terminal device 110, the communication devices 130, or the second terminal device 120.

As shown, the apparatus 1000 includes a processor 1010, a memory 1020 coupled to the processor 1010, and a suitable transmitter (TX) and receiver (RX) 1040 coupled to the processor 1010. The memory 1010 stores at least a part of a program 1030. The TX/RX 1040 is for bidirectional communications. The TX/RX 1040 is coupled to at least one antenna to facilitate communication, though, in practice, an Access Node mentioned in this application may have several antennas. The TX/RX 1040 may be coupled to a communication interface (not shown). The communication interface may represent any interface that is necessary for communication with other network elements, such as X2 interface for bidirectional communications between eNBs, S1 interface for communication between a Mobility Management Entity (MME)/Serving. Gateway (S-GW) and the eNB, Un interface for communication between the eNB and a relay node (RN), or Uu interface for communication between the eNB and a terminal device.

A program 1030 is assumed to include program instructions that, when executed by the associated processor 1010, enable the apparatus 1000 to operate in accordance with the embodiments of the present disclosure, as discussed herein with reference to FIGS. 2-9. The embodiments herein may be implemented by computer software executable by the processor 1010 of the apparatus 1000, or by hardware, or by a combination of software and hardware. The processor 1010 may be configured to implement various embodiments of the present disclosure. Furthermore, a combination of the processor 1010 and memory 1010 may form processing means 1050 adapted to implement various embodiments of the present disclosure.

The memory 1010 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1010 is shown in the apparatus 1000, there may be several physically distinct memory modules in the apparatus 1000. The processor 1010 may be of any type suitable to the local technical network, and may include one or more of general purpose computers, special purpose computers, microprocessors, digital signal processors (DSPs) and processors based on multicore processor architecture, as non-limiting examples. The apparatus 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3, 5, 8, 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In an exemplary embodiment, a method performed by a first communication device comprises: transmitting, to a second communication device, a request to assist in a ranging between the first communication device and a third communication device; receiving, from the second communication device, a response to the request; and based on ranging information comprised in the response, wherein the ranging information is associated with the second communication device for assisting with the ranging between the first and third communication devices, providing a first ranging with the third communication device via the second communication device.

In an exemplary embodiment, transmitting the request to assist in the ranging between the first and third communication devices comprises: transmitting, to the second communication device, demand information concerning the ranging between the first and third communication devices; receiving, from the second communication device, a positive feedback indicating a capability of the second communication device to assist in the ranging; and in response to receiving the positive feedback, transmitting the request to assist in the ranging between the first and third communication devices.

In an exemplary embodiment, transmitting the request to assist in the ranging between the first and third communication devices comprises: receiving, from the second communication device, information indicating that the second communication device has a capability to assist in the ranging; and in response to receiving the information, transmitting the request to the second communication device.

In an exemplary embodiment, at least one of the following criteria is satisfied: the second communication device has a capability to assist in the ranging between the first and third communication devices, the second communication device is in communication with the first communication device, the second communication device is located within a ranging distance from the first communication device, a strength of a signal received by the first communication device from the second communication device exceeds a threshold, the second communication device is oriented in a potential direction range of the third communication device, the first and second communication devices belong to a same device group, or the first and second communication devices are associated with a same communication network.

In an exemplary embodiment, the request to assist in the ranging between the first and third communication devices comprises at least one of: an identity of the first communication device, an identity of the third communication device, an effective ranging distance of the first communication device, a potential direction range of the third communication device, an accuracy requirement for the ranging, a reliability requirement for the ranging, or a requirement for a movement speed of the second communication device assisting in the ranging.

In an exemplary embodiment, the ranging information comprised in the response is further associated with a fourth communication device for assisting in the ranging between the first and third communication devices.

In an exemplary embodiment, the method further comprises: in response to the response from the second communication device indicating a rejection of the request, retransmitting the request to assist in the ranging between the first and third communication devices to a fourth communication device that is different from the second communication device.

In an exemplary embodiment, the response received from the second communication device further comprises at least one of: an identity of the third communication device, an identity of the second communication device assisting in the ranging, an accuracy associated with the ranging information, a reliability associated with the ranging information, a time stamp associated with the ranging information, a move-ment speed of the third communication device, or a movement speed of the second communication device assisting in the ranging.

In an exemplary embodiment, a method performed by a first communication device comprises: receiving, from a second communication device, a request to assist in a ranging between the second communication device and a third communication device; and transmitting a response to the request to the second communication device, to assist in the ranging between the second and third communication devices, wherein ranging information associated with the first communication device is comprised in the response, the ranging information being for assisting with a first ranging between the second and third communication devices via the first communication device.

In an exemplary embodiment, the method further comprises: receiving, from a second communication device, demand information concerning the ranging between the second and third communication devices; and transmitting, to the second communication device, a positive feedback indicating a capability of the first communication device to assist in the ranging.

In an exemplary embodiment, the method further comprises: transmitting, to the second communication device, information indicating that the first communication device has a capability to assist in the ranging between the second and third communication devices.

In an exemplary embodiment, the ranging information comprised in the response is further associated with a fourth communication device for assisting in the ranging between the second and third communication devices.

In an exemplary embodiment, at least one of the following criteria is satisfied: the first communication device has a capability to assist in the ranging between the second and third communication devices, the first communication device is in communication with the second communication device, the first communication device is located within a ranging distance from the second communication device, a strength of a signal received at the second communication device from the first communication device exceeds a threshold, the first communication device is oriented in a potential direction range of the third communication device, the first and second communication devices belong to a same device group, or the first and second communication devices are associated with a same communication network.

In an exemplary embodiment, the request comprises at least one of: an identity of the first communication device, an identity of the second communication device, an identity of the third communication device, an effective ranging distance of the second communication device, a potential direction range of the third communication device, an accuracy requirement for the ranging, a reliability requirement for the ranging, or a requirement for a movement speed of the second communication device assisting in the ranging.

In an exemplary embodiment, the method further comprises: in response to a failure in obtaining the ranging information, transmitting to the second communication device a response to the request indicating a rejection of the request.

In an exemplary embodiment, the response further comprises at least one of: an identity of the third communication device, an identity of the first communication device, an accuracy associated with the ranging information, a reliability associated with the ranging information, a time stamp associated with the ranging information, a movement speed of the first communication device, or a movement speed of the third communication device.

Reference to an element in the singular is not intended to mean "one and only one" unless explicitly so stated, but rather is intended to mean "one or more." Where a phrase similar to "any combination of A, B, C" is used herein, it is intended that the phrase be interpreted to mean that A alone can be present in an embodiment, B alone can be present in an embodiment, C alone can be present in an embodiment, and that any combination of the elements A, B, and C can be present in a single embodiment. For example, any combination of the elements A, B, and C includes the combinations of A and B, A and C, B and C, and A and B and C can each be present in an embodiment.

When elements, such as A and B, are described as being "A/B" or a "/" is used, then the description is intended to cover all the following combinations: A alone, B alone, or A and B together.

What is claimed is:

1. A method performed by a first communication device, the method comprising:

receiving, from a second communication device, information indicating that the second communication device has a capability to assist in a ranging between the first communication device and a third communication device;

transmitting, to the second communication device in response to receiving the information, a request to assist in the ranging between the first communication device and the third communication device;

receiving, from the second communication device, a response to the request; and based on ranging information included in the response, the ranging information being associated with the second communication device for assisting with the ranging between the first and third communication devices, providing a first ranging with the third communication device via the second communication device.

2. The method of claim 1, wherein transmitting the request to assist in the ranging between the first and third communication devices comprises:

transmitting, to the second communication device, demand information concerning the ranging between the first and third communication devices;

receiving, from the second communication device, a positive feedback indicating the capability of the second communication device to assist in the ranging; and in response to receiving the positive feedback, transmitting the request to assist in the ranging between the first and third communication devices.

3. The method of claim 1, wherein at least one of multiple criteria is satisfied, the multiple criteria including:

the second communication device has the capability to assist in the ranging between the first and third communication devices, the second communication device is in communication with the first communication device, the second communication device is located within a ranging distance from the first communication device, a strength of a signal received by the first communication device from the second communication device exceeds a threshold, the second communication device is oriented in a potential direction range of the third communication device, the first and second communication devices belong to a same device group, or the first and second communication devices are associated with a same communication network.

4. The method of claim 1, wherein the request to assist in the ranging between the first and third communication devices comprises at least one of:

an identity of the first communication device, an identity of the third communication device, an effective ranging distance of the first communication device, a potential direction range of the third communication device, an accuracy requirement for the ranging, a reliability requirement for the ranging, or a requirement for a movement speed of the second communication device assisting in the ranging.

5. The method of claim 1, wherein the ranging information included in the response is further associated with a fourth communication device for assisting in the ranging between the first and third communication devices.

6. A first communication device for wireless communication, comprising:

at least one memory; and at least one processor coupled with the at least one memory and configured to cause the first communication device to:

receive, from a second communication device, information indicating that the second communication device has a capability to assist in a ranging between the first communication device and a third communication device;

transmit, to the second communication device in response to receiving the information, a request to assist in the ranging between the first communication device and the third communication device;

receive, from the second communication device, a response to the request from the second communication device; and based on ranging information included in the response, the ranging information being associated with the second communication device for assisting with the ranging between the first and third communication devices, provide a first ranging with the third communication device via the second communication device.

7. A first communication device for wireless communication, comprising:

at least one memory; and at least one processor coupled with the at least one memory and configured to cause the first communication device to:

transmit, to a second communication device, information indicating that the first communication device has a capability to assist in a ranging between the second communication device and a third communication device;

receive, from the second communication device in response to transmitting the information, a request to assist in the ranging between the second communication device and the third communication device; and transmit, to the second communication device, a response to the request to assist in the ranging between the second and third communication devices, the response including ranging information associated with the first communication device, the ranging information being for assisting with a first ranging between the second and third communication devices via the first communication device.

8. The first communication device of claim 7, wherein the at least one processor is configured to cause the first communication device to:

receive, from the second communication device, demand information concerning the ranging between the second and third communication devices; and transmit, to the second communication device, a positive feedback indicating the capability of the first communication device to assist in the ranging.

9. The first communication device of claim 7, wherein the ranging information included in the response is further associated with a fourth communication device for assisting in the ranging between the second and third communication devices.

10. The first communication device of claim 7, wherein at least one of multiple criteria is satisfied, the multiple criteria including:

the first communication device has the capability to assist in the ranging between the second and third communication devices, the first communication device is in communication with the second communication device, the first communication device is located within a ranging distance from the second communication device, a strength of a signal received at the second communication device from the first communication device exceeds a threshold, the first communication device is oriented in a potential direction range of the third communication device, the first and second communication devices belong to a same device group, or the first and second communication devices are associated with a same communication network.

11. The first communication device of claim 7, wherein the request comprises at least one of:

an identity of the first communication device, an identity of the second communication device, an identity of the third communication device, an effective ranging distance of the second communication device, a potential direction range of the third communication device, an accuracy requirement for the ranging, a reliability requirement for the ranging, or a requirement for a movement speed of the second communication device assisting in the ranging.

12. The first communication device of claim 6, wherein to transmit the request to assist in the ranging between the first and third communication devices is to:

transmit, to the second communication device, demand information concerning the ranging between the first and third communication devices;

receive, from the second communication device, a positive feedback indicating the capability of the second communication device to assist in the ranging; and in response to receiving the positive feedback, transmit the request to assist in the ranging between the first and third communication devices.

13. The first communication device of claim 6, wherein at least one of multiple criteria is satisfied, the multiple criteria including:

the second communication device has the capability to assist in the ranging between the first and third communication devices, the second communication device is in communication with the first communication device, the second communication device is located within a ranging distance from the first communication device, a strength of a signal received by the first communication device from the second communication device exceeds a threshold, the second communication device is oriented in a potential direction range of the third communication device, the first and second communication devices belong to a same device group, or the first and second communication devices are associated with a same communication network.

14. The first communication device of claim 6, wherein the request to assist in the ranging between the first and third communication devices comprises at least one of:

an identity of the first communication device, an identity of the third communication device, an effective ranging distance of the first communication device, a potential direction range of the third communication device, an accuracy requirement for the ranging, a reliability requirement for the ranging, or a requirement for a movement speed of the second communication device assisting in the ranging.

15. The first communication device of claim 6, wherein the ranging information included in the response is further associated with a fourth communication device for assisting in the ranging between the first and third communication devices.

16. The first communication device of claim 6, wherein the response received from the second communication device further comprises at least one of:

an identity of the third communication device, an identity of the second communication device assisting in the ranging, an accuracy associated with the ranging information, a reliability associated with the ranging information, a time stamp associated with the ranging information, a movement speed of the third communication device, or a movement speed of the second communication device assisting in the ranging.

17. A method performed by a first communication device, the method comprising:

transmitting, to a second communication device, information indicating that the first communication device has a capability to assist in a ranging between the second communication device and a third communication device;

receiving, from the second communication device in response to transmitting the information, a request to assist in the ranging between the first communication device and the third communication device; and transmitting, to the second communication device, a response to the request to assist in the ranging between the second and third communication devices, the response including ranging information associated with the first communication device, the ranging information being for assisting with a first ranging between the second and third communication devices via the first communication device.

18. The method of claim 17, further comprising:

receiving, from the second communication device, demand information concerning the ranging between the second and third communication devices; and transmitting, to the second communication device, a positive feedback indicating the capability of the first communication device to assist in the ranging.

19. The method of claim 17, wherein the ranging information included in the response is further associated with a fourth communication device for assisting in the ranging between the second and third communication devices.

20. The method of claim 17, wherein at least one of multiple criteria is satisfied, the multiple criteria including:

the first communication device has the capability to assist in the ranging between the second and third communication devices, the first communication device is in communication with the second communication device, the first communication device is located within a ranging distance from the second communication device, a strength of a signal received at the second communication device from the first communication device exceeds a threshold, the first communication device is oriented in a potential direction range of the third communication device, the first and second communication devices belong to a same device group, or the first and second communication devices are associated with a same communication network.

* * * * *